United States Patent
Poornachandran et al.

(10) Patent No.: US 12,174,606 B2
(45) Date of Patent: Dec. 24, 2024

(54) AUTOMATED MACHINES AND SYSTEMS

(71) Applicant: Intel Corporation, Santa Clara, CA (US)

(72) Inventors: Rajesh Poornachandran, Portland, OR (US); Omesh Tickoo, Portland, OR (US); Vinayak Honkote, Bangalore (IN); John Charles Weast, Portland, OR (US); Rita H. Wouhaybi, Portland, OR (US); Stanley Mo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 852 days.

(21) Appl. No.: 17/130,025

(22) Filed: Dec. 22, 2020

(65) Prior Publication Data

US 2021/0109493 A1    Apr. 15, 2021

(51) Int. Cl.
*G05B 19/042*    (2006.01)
*B25J 19/00*    (2006.01)
*G05B 13/02*    (2006.01)

(52) U.S. Cl.
CPC ...... *G05B 19/0423* (2013.01); *B25J 19/0066* (2013.01); *G05B 13/0265* (2013.01); *G05B 2219/25146* (2013.01)

(58) Field of Classification Search
CPC ............ G05B 19/0423; G05B 13/0265; G05B 2219/25146; G05B 2219/39413; B25J 19/0066; B25J 9/1674; G05D 1/0221; G05D 1/0219
See application file for complete search history.

(56) References Cited

U.S. PATENT DOCUMENTS

| | | | |
|---|---|---|---|
| 2019/0197396 A1* | 6/2019 | Rajkumar | B25J 9/1671 |
| 2019/0197497 A1* | 6/2019 | Abari | G05D 1/0088 |
| 2019/0382004 A1* | 12/2019 | Golov | B60W 60/001 |

* cited by examiner

*Primary Examiner* — Charles R Kasenge
(74) *Attorney, Agent, or Firm* — VIERING, JENTSCHURA & PARTNER MBB

(57) ABSTRACT

According to various aspects, a controller for an automated machine may include: one or more processors configured to: obtain a message from a further automated machine in accordance with a communication protocol, the message including a first result of a first sensing process that the further automated machine performs; and determine an assessment of the automated machine based on the first result and based on a second result of a second sensing process that the automated machine performs.

15 Claims, 14 Drawing Sheets

AUTOMATED MACHINES AND SYSTEMS

TECHNICAL FIELD

Various aspects of this disclosure generally relate to autonomous machines, controllers, code segments and methods thereof.

BACKGROUND

For various tasks, autonomous machines are applicable as replacement for humans, assistance for humans and providers for other services. Among others, autonomous machines are employed in industrial environments, such as fabrication, or delivery environment's. The capability of such autonomous machines are under constant development and research. Among others, various demands are directed to solve more complex and comprehensive tasks by autonomous machines, as well as reducing the effort of their employment.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
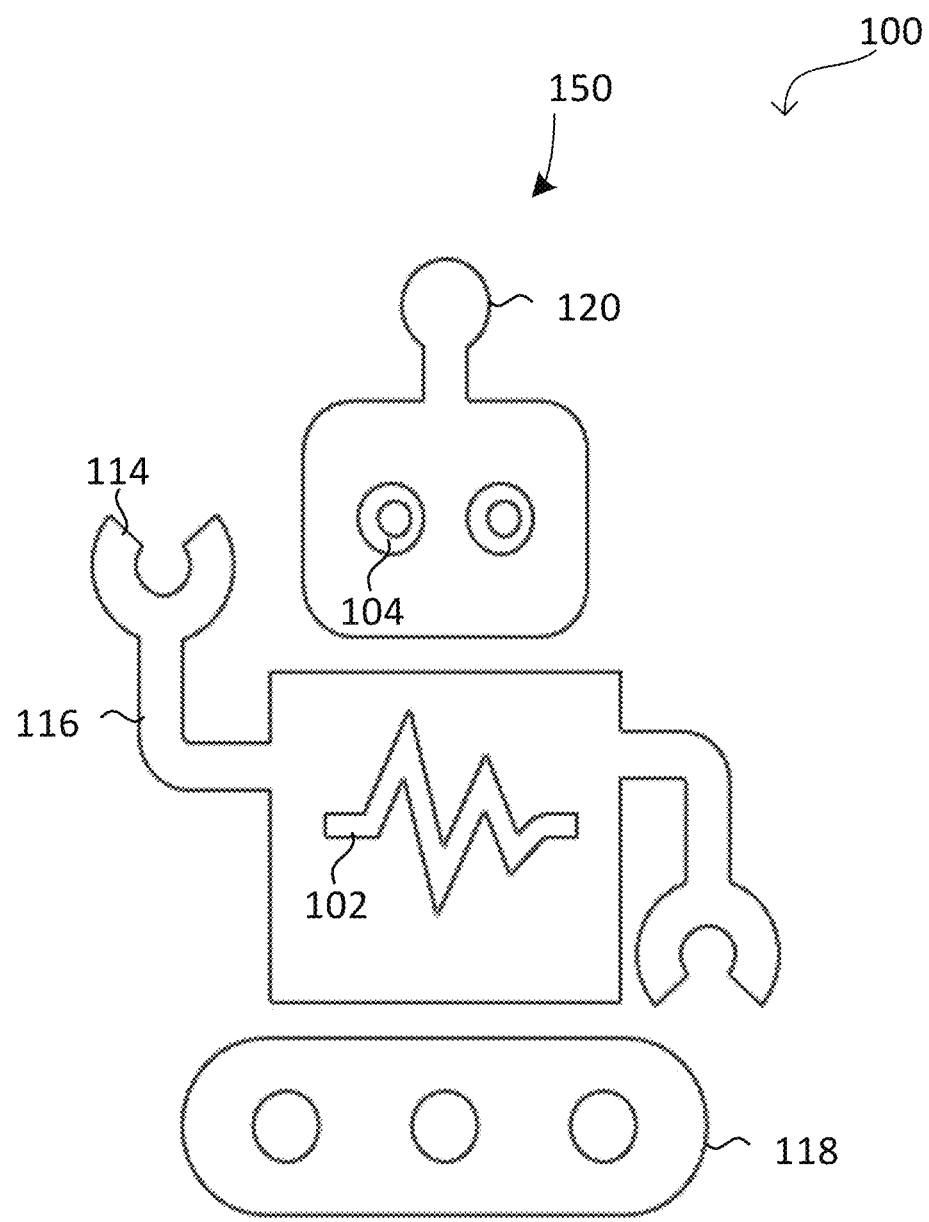
FIG. 1 shows an example of a machine in accordance with various aspects of the present disclosure.

The following detailed description refers to the accompanying drawings that show, by way of illustration, exemplary details and aspects in which the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as used herein may be understood as any kind of technological entity that allows handling of data. The data may be handled according to one or more specific functions that the processor or controller may execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" as used herein may be understood as a computer-readable medium (e.g., a non-transitory computer-readable medium), in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where radio-layer components carry out the physical transmission and reception, such as radio frequency (RF) transceivers and antennas, and the processors or controllers perform the logical transmission and reception over the software-level connection. The term "communicate" encompasses one or both of transmitting and receiving, i.e., unidirectional or bidirectional communication in one or both of the incoming and outgoing directions. In general, the term "communicate" may include the exchange of data, e.g., unidirectional or bidirectional exchange in one or both of the incoming and outgoing directions. The term "calculate" encompasses both 'direct' calculations via a mathematical expression/formula/relationship and 'indirect' calculations via lookup or hash tables and other array indexing or searching operations.

A "machine" may be understood to include any type of mechanical structure that uses (e.g., electrical) power to alter its environment, to apply forces, to control movement and/or to perform an intended action, e.g., a mechanical structure programmable by a computer. By way of example, a machine may be a driven object with a combustion engine, a reaction engine, an electrically driven object, a hybrid driven object, or a combination thereof. A machine may be or may include a humanoid machine, a non-humanoid machine, an agricultural machine, a machine tool, a moving machine, a stationary machine, a drone, an industrial machine, a medical operating machine, a collectively operating machine, a ground machine, an aerial machine, an aquatic machine, or a mixture thereof, among others.

A "ground machine" may be understood to include any type of machine, as described above, which is configured to traverse the solid ground, e.g., within a building, as part of a production line, on a street, on a road, on a track, off-road, etc. An aerial machine may be understood to include any type of machine, as described above, which is configured lift itself, e.g., to fly or hover.

An "aquatic machine" may be understood to include any type of machine, which is configured to travel on, just above the surface or below the waterline. It may float, be a submersible or travel upon the surface of the water as in a hydrofoil.

The term "automated machine" as used herein (also referred to as a at least partially autonomous machine or as robot) may describe a machine capable of managing one or more tasks (also referred to as task performance) at least partially without human intervention, input, and/or control. Examples of the automated machine may include a hybrid machine, a human assisted machine and/or an autonomous machine. The term "autonomous machine" as used herein (also referred to as autonomous robot) may describe a (e.g., automated) machine capable of managing one or more tasks (also referred to as task performance) without human intervention, input, and/or control. Exemplary components of managing task may include: managing one or more physical tasks (also referred to as task management), planning the task performance, organizing the task performance, scheduling the task performance, switching between two tasks, competing for one or more task, assigning one or more tasks, completing one or more tasks, reporting about completion of the one or more tasks, negotiation of the allocation of one or more tasks (e.g., between multiple autonomous machines), monitoring the progress of one or more tasks, navigate the autonomous machine to one or more positions of one or more tasks (e.g., at which the one or more task require a physical manipulation), etc.

References made herein to robots or automated machines may be understood as exemplarily and may analogously apply to any type of autonomous machine, and vice versa. References made herein with regard to one or more autonomous machines may analogously apply to one or more automated machines. According to various aspects, the task management may be collaborative, e.g., when multiple robots are allocated to one or more tasks. The robots implementing the collaborative task management may be configured to exchange data related to the task management.

The task performance may include processing one or more workpieces, e.g., by adding material to the workpiece, removing material from the workpiece, transforming the workpiece and the like. The autonomous machine may implement one or more task performance models, e.g., a respective controller of the autonomous machine may implement the one or more task performance models. A task performance model may be configured to control the task performance by the autonomous machine based on input data, e.g., to convert the input data into control instructions. The controller may be configured to transmit the control instructions within the autonomous machine, e.g., in accordance with an in-machine communication protocol (e.g., a fieldbus communication protocol) and/or to one or more actuators of the autonomous machine. Generally, a task performance model may be (e.g., at least in part) rule based and/or may be (e.g., at least in part) based on machine learning.

Examples of the input data may include: data that one or more of the sensors of the autonomous machine sensed, data that the autonomous machine stores (e.g., in a database), data indicating instructions provided to the autonomous machine (e.g., data that an operator or a group leader receives), data about an affiliation of the autonomous machine to a group (also referred to as group affiliation), data about an assignment of the autonomous machine to one or more tasks of the group, data exchanged between multiple autonomous machines (e.g., data transmitted from another autonomous machine of the group), and/or data about a mission (also referred to as mission data). The control instructions may be understood as in-machine instructions to control one or more actuators of the autonomous machine. Examples of the one or more actuators of the autonomous machine may include: one or more actuators configured to cause a motion of the autonomous machine, one or more actuators configured to actuate a tool of the autonomous machine, one or more actuators configured to move the tool (also referred to as effector) of the autonomous machine (e.g., relative to the one or more actuators configured to cause a motion of the autonomous machine), one or more actuators being part of the kinetic chain (e.g., a robotic arm) of the autonomous machine.

For example, the task performance may be based on sensed data (also referred to as sensing result, sensor data, or as sensing data), e.g., measurements by one or more sensors of the autonomous machine or measurements by one or more sensors external to the autonomous machine (e.g., one or more sensors of another autonomous machine). For example, the task performance may be based on information about the environment of the autonomous machine, e.g., information that the one or more sensors of the autonomous machine sensed or information that one or more external sensors sensed. Alternatively, the task performance may be based on a progress of performing one or more tasks that the autonomous machine performs. For example, one or more sensors of the autonomous machine or the one or more external sensors may be configured to sense the progress of performing the one or more tasks that the autonomous machine performs. For example, task performance may include navigating the machine according to one or more positions, at which the machine performs one or more tasks.

Performing one or more tasks may include one or more actions of the autonomous machine, e.g., one or more spatially distributed actions (e.g., a spatial sequence of actions) and/or one or more spatially chronological actions (e.g., in a chronologic sequence of operations). The spatial distribution of multiple actions (also referred to as machine actions) may indicate, where (i.e., with which spatial relation) and/or in which direction the autonomous machine provides the one or more actions, i.e. in which corresponding spatial position (i.e. position and/or orientation) the autonomous machine or its tool is located.

The one or more tasks may be represented (e.g., logically) by data (also referred to as mission data). A mission may refer to one task or a group of multiple tasks, which are related to each other, e.g., contextually or logically related to each other (for example, tasks directed to the fabrication of a certain product, tasks directed to the exploration of a certain are, and the like). The mission data may be a formal representation of the mission. Examples of the mission data may include: data identifying each task (also referred to as task identifier), data organizing each task (e.g., spatial and/or chronological data), data indicating the criteria under which a task is fulfilled, data indicating goals of each task, data identifying criteria for triggering, terminating, or maintaining a task, etc.

Furthermore, the mission data may include a mission logic, which logically links tasks, priorities, criteria, conditions and/or tasks and/or which implements a sequence (e.g., a flow chart), according to which the mission is executed. For example, the mission logic may organize the mission hierarchically, e.g., into hierarchical levels, hierarchical groups, subtasks, and the like. For example, a task may include multiple subtasks on a lower hierarchical level, which may be, but not need to be, prioritized, contextual based and/or conditional. Viewed from the hierarchical level of the subtask, the subtask may also be referred to as task, and may include, but not need to include, multiple subtasks. For example, the mission logic may organize the mission in accordance with conditional aspects and/or contextual aspects. For example, the mission logic may define conditional tasks, e.g., by defining conditions/requirements to be fulfilled for starting a task performance and/or for ending a task performance.

Herein the term "collaborate", "collaborative", "collaboration" refers to entities, such as devices (a plurality of autonomous machines), methods and functions, as examples, participating to accomplish a mission. Examples of the collaborative entities may include various types of agents or actors, such as automated machines (e.g., partially of fully autonomous machines), humans, non-automated machines, or non-autonomous machines. Multiple entities (e.g., autonomous machines) participating in the mission may be affiliated (e.g., assigned) to a group (herein also referred to as group, swarm or as team), e.g., being members (also referred to as agents or as nodes) of the group. Multiple autonomous machines participating in the mission may be affiliated (e.g., assigned) to a group of autonomous machines (herein also referred to as group, swarm or as team), e.g., being members (also referred to as agents or as nodes) of the group of autonomous machines. Each group (e.g., of autonomous machines) may be entrusted with one or more missions.

References made herein with respect to a group of autonomous machines may analogously apply to a group of entities, e.g., including various types of agents or actors, such as automated machines (e.g., partially of fully autonomous machines), humans, non-automated machines, or non-autonomous machines. The autonomous machine may be configured to collaborate with one or more other autonomous machine, e.g., by implementing one or more protocols (also referred to as collaboration protocols). Examples of collaboration protocols may include: a protocol for group management (also referred to as group management protocol), a protocol for communication (e.g., data exchange) between members of a group of collaborating autonomous machines (also referred to as group communication protocol), a protocol for managing tasks of the mission (also referred to as task management protocol).

Generally, a protocol may define rules that indicate the format, syntax, semantics and/or synchronization of information, e.g., of information transfer (e.g., exchange), information storage, information processing, and the like. For example, the autonomous machine may form, join and/or leave a group in accordance with the group management protocol. For example, the autonomous machine may be configured to communicate with other members of the group in accordance with the group communication protocol. For example, the autonomous machine may be configured to exchange sensed data or exchange model data with other members of the group in accordance with the group communication protocol (also referred to as data exchange protocol). For example, a group identifier used to route a message generated in accordance with the group communication protocol to the group.

The automated machine may be configured to broadcast the message to all members of the group, and/or a member identifier or topical filter may route the message to individual members of the group. For example, the autonomous machine may be configured to manage the task performance in accordance with the task management protocol, e.g., synchronizing mission data and/or the status (e.g., the progress and/or accomplishment) of one or more tasks of the mission.

The term "target information" may indicate the respective information of interest about the environmental property. The target information may include various types of information about the environment of the sensor, which are based on the sensing process that the sensor performs, e.g., a result thereof. According to various aspects, the target information may include information about one or more logic, geometric, kinematic, mechanical, radiometric (e.g., photometric), thermodynamically, electrical and/or chemical properties of the environment of the sensor, which are based on the sensing process that the sensor performs, e.g., on a result thereof. This is reflected by the type of the target information, which may be a logical type, geometrical type, kinematical type, mechanical type, radiometrical type (e.g., photometric type), thermodynamical type, electrical type and/or chemical type.

The term "result" with regard to a sensing process (also referred to as sensing result or as result of the sensing process) may refer to an interim stage of data that the sensing chain processes and/or to the target information as output of the processing chain. Examples of the sensing result may include: sensor raw data, an aggregation of raw data, pre-processed (e.g., filtered and/or converted) raw data, a quantized result of processing the sensor raw data, e.g., including numerical information about the sensed property (e.g., one or more values of the sensed property), a classified result of processing the sensor raw data, an estimation made based on the raw data (e.g., output of a model), etc. Examples of the result of an image acquisition as sensing process, may include pixel raw data, the image data based on the raw data, a video, the result of an object recognition based on the image data, a spectral composition, a light intensity value, a distance determined based on the image data, etc.

Various aspects herein may utilize one or more machine learning models to perform or control functions of the machine (or other functions described herein). The term "model" used herein may be understood as any kind of algorithm, which provides output data based on input data provided to the model (e.g., any kind of algorithm generating or calculating output data based on input data). A computing system may execute a machine learning model to progressively improve performance of a specific task. In some aspects, parameters of a machine learning model may be adjusted during a training phase based on training data. A trained machine learning model may be used during an inference phase to make estimations or decisions based on input data. In some aspects, the trained machine learning model may be used to generate additional training data. An additional machine learning model may be adjusted during a second training phase based on the generated additional training data. A trained additional machine learning model may be used during an inference phase to make estimations or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to estimate the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive feedback (also referred to as reward) or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify environmental conditions, such as weather conditions and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

For example, the controller of an autonomous machine may be configured to train the task performance model based on training data. The training data may include the control instructions, a result of the task performance (also referred to as actual result) and/or a predefined result (also referred to as expected result or target result). For example, the controller may be configured to determine the result of the task performance by sensing the environment of the machine. For example, the predefined result may represent an optimum result or a range of results that are acceptable. Said more generally, the training data may indicate whether the result of the task performance fulfills a predefined criterion, e.g., by comparing the actual result with the predefined result. For example, the criterion may be fulfilled when a deviation of the actual result from the predefined result is zero.

Generally, the actual result and/or the predefined result may be parameterized, e.g., represented by data (also referred to as result data) including one or more parameters as information about the result. For example, the result data may include sensed parameters, such as physical, electrical and/or chemical properties of the result.

Throughout the present disclosure, the following terms may be used as synonyms: parameter set, model parameter set, safety layer parameter set, automated motion model parameter set, and/or the like. These terms may correspond to groups of values used to implement one or more models for directing an autonomous machine to operate according to the manners described herein.

Furthermore, throughout the present disclosure, the following terms may be used as synonyms: parameter, model parameter, safety layer parameter, and/or automated movement model parameter, and/or the like, and may correspond to specific values within the previously described sets.

Aspects detailed herein provide for a robust collaborative sensing and self-assessment for autonomous machines that improves the determination and/or handling of sensory failures, reduces the effort for the determination and/or handling of sensory failures, and reduces the down time of autonomous machines due to sensory failures.

FIG. 1 shows an example of an autonomous machine 150 in accordance with various aspects 100 of the present disclosure. In some aspects, the machine 150 may include one or more processors 102; one or more sensors 104; one or more effectors 114; one or more kinetic chains 116 (e.g., holding an effector); one or more propulsion devices 118; and/or one or more communication devices 120.

A sensor (also referred to as detector) may be understood as a transducer that is configured to qualitatively or quantitatively sense a property of its environment (also referred to as environmental property) corresponding to the sensor type, e.g., a geometric, kinematic, mechanical, radiometric (e.g., photometric), thermodynamically, electrical and/or chemical property. The sensed quantity is the physical quantity, to which a sensing process using the sensor is directed. Depending on the complexity of the sensor's environment to be sensed, the sensor may be configured to distinguish only between two states of the sensed quantity or to distinguish between more than two states of the sensed quantity. A sensor may be part of a specific processing chain (also referred to as sensing chain), which includes a corresponding infrastructure (e.g., including processor, storage medium and/or bus system or the like).

The sensing chain may be configured to operate the corresponding sensor (e.g., water sensor, pressure sensor and/or actuation sensor), to process its sensed quantity as input and to provide a target information as output, which represents the input. According to various aspects, the one or more processors 102 (e.g., being components of a controller) may be configured to implement at least a part of the sensing chain. It is noted that the sensing chain may optionally include (e.g., wireless and/or wired) data exchange, e.g., between various nodes of a network based sensing chain. For example, the sensing chain may be configured to output the sensing result via an electrical signal (also referred to as sensor signal) or communicate the sensing result (e.g., wirelessly and/or via wire) to another component of the sensing chain or to a further communication device (e.g., of a further autonomous machine).

According to various aspects, the sensing result (also referred to as sensor data) may include sensor raw data, quantized information about the sensed property (e.g., one or more values of the sensed property), or a result of processing the information about the sensed property and/or the sensor raw data. For example, the result of an image acquisition as exemplarily sensing process, may include pixel raw data, the image data based on the raw data, the result of an object recognition based on the image data, a spectral composition, a light intensity value, a distance determined based on the image data, etc. The result of the sensing process may include various types of information about an environment of the sensor, which are based on the sensing process that the sensor may perform. According to various aspects, the result of the sensing process may include information about one or more logic, geometric, kinematic, mechanical, radiometric (e.g., photometric), thermodynamically, electrical and/or chemical properties of the environment of the sensor, which are determined based on the sensing process that the sensor may perform. Analogously, the type of information may be a logic type, geometric type, kinematic type, mechanical type, radiometric type (e.g., photometric type), thermodynamic type, electric type and/or chemical type.

According to various aspects, the sensing chain (e.g., the one or more processors 102) may be configured to obtain the same sensing result by sensing various environmental properties and/or various sensors may be configured to obtain the same sensing result. For example, the sensing chain (e.g., the one or more processors 102) may be configured to determine a distance of the autonomous machine from an object based on a radar sensor, a LIDAR sensor, or also by processing image data from a camera, e.g., stereographic image data. For example, the sensing chain (e.g., the one or more processors 102) may be configured to determine a temperature based on a resistive temperature sensor or based on a radiometric sensor, e.g., based on a spectral composition that the radiometric sensor sensed.

Generally, each sensor 104 may be configured to sense an actual condition (also referred to as actual state), e.g., the condition at the point of time of the sensing process. Examples of the one or more sensors 104 may be configured to sense the actual condition of the machine 150 (also referred to as operational condition), wherein other examples of the one or more sensors 104 may be configured to sense the actual condition of the environment of the machine 150 (also referred to as environmental condition), e.g., to which the one or more sensors 104 are exposed.

Examples of sensing the actual condition of the machine 150 may include: sensing the temperature of the machine 150, sensing the position of an effector, sensing the position of one or more nodes of the kinetic chain 116, sensing the position and/or orientation of the machine 150, sensing the speed of the machine, sensing an operation and/or status of the effector, e.g., sensing a force that the effector may generate, sensing a fluid flow that the effector may generate, generating an electrical power output that the effector may generate. Examples of sensing the environmental condition of the machine 150 may include: sensing an object in the vicinity of the machine 150, e.g., one or more properties of the object; sensing a progress of the task performance; sensing radiation in the vicinity of the machine 150, e.g., electromagnetic radiation or particle radiation; sensing sound/acoustics. Examples of the object may include: the workpiece that machine 150 may process, a human, another machine; a fluid, a gas, a solid. Examples of the properties of the object may include: a distance of the object from the machine; a position of the object; a temperature of the object; a texture of the object; a chemical composition of the object; a movement of the object; etc.

Examples of the one or more sensors 104 include one or more optoelectronic sensors 105 (e.g., providing one or more image acquisition devices), one or more position sensors 106, one or more speed sensors, one or more distance sensors 108, e.g., one or more radar sensors and/or one or more LIDAR sensors, one or more temperature sensors 110, one or more force sensors 112.

Examples of the one or more propulsion devices 118 may include one or more ground propulsion devices 118, one or more water propulsion devices 118 and/or one or more air propulsion devices 118. Exemplary components of a propulsion device 118 may include one or more motors; one or more rollers; one or more tires; one or more continuous tracks; one or more propellers; and the like. Exemplary components of a communication device 120 may include one or more (e.g., wireless and/or wired) transceivers 208, 210, 212; one or more antennas (also referred to as antenna system); one or more amplifiers, one or more filters, one or more modulators, one or more demodulators, one or more baseband-processors, one or more signal processors, one or more memories.

Optionally, one or more components of the autonomous machine 150 may be configured exchangeable (also referred to as exchangeable components). The autonomous machine may be configured to unmount an exchangeable component and mount a further exchangeable component in place of the unmounted component (also referred to as self-change process). For example, at least one effector of the autonomous machine 150 may be configured to as exchangeable component. In this case, the kinetic chain 116 holding the effector may be configured to release (e.g., unmount) the effector and mount another effector (also referred to as change tools).

As outlined below in more detail, the one or more processors 102 may be configured to generate one or more messages in accordance with a (e.g., wireless and/or wired) communication protocol and provide the generated one or more messages to the one or more communication devices 120. The one or more communication devices 120 may be configured to send the one or more messages in accordance with a (e.g., wireless and/or wired) communication protocol. Analogously, the one or more communication devices 120 may be configured to receive one or more messages in accordance with a (e.g., wireless and/or wired) communication protocol and provide the received one or more messages to the one or more processors 102. The one or more processors 102 may be configured to process the one or more messages.

In some aspects, the machine 150 may include a control system 251 (as described with respect to FIG. 2 below). It is appreciated that machine 150 and control system 251 are exemplary in nature and may thus be simplified for explanatory purposes. Locations of elements and relational distances (as discussed above, the figures are not to scale) are provided as examples and are not limited thereto. The control system 251 may include various components depending on the requirements of a particular implementation.

Figure 2:
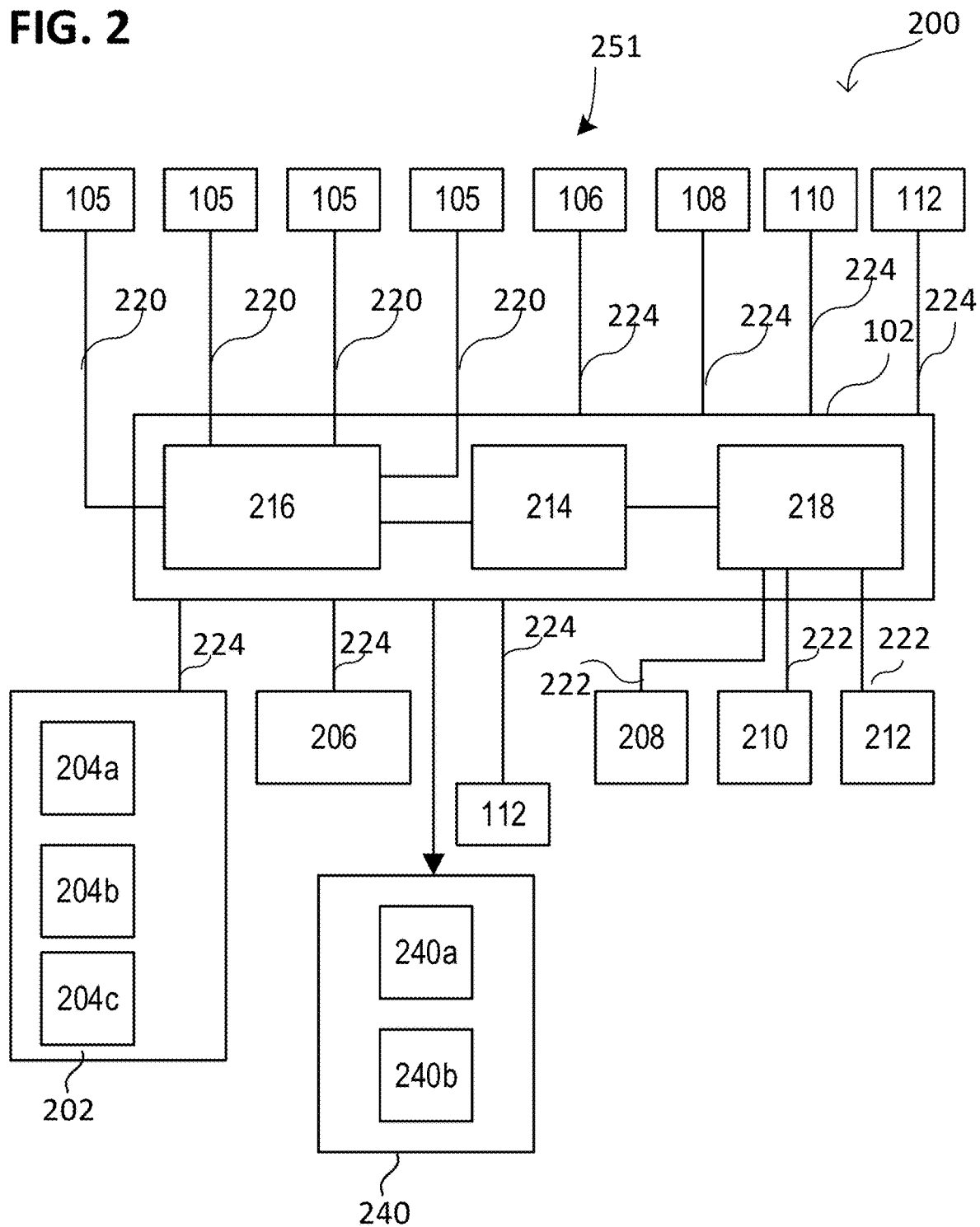
FIG. 2 shows various exemplary electronic components of a control system of the machine in accordance with various aspects of the present disclosure.

FIG. 2 shows various exemplary electronic components of a machine, namely control system 251, in accordance with various aspects 200 of the present disclosure. In some aspects, the control system 251 may include one or more processors 102, one or more image acquisition devices 105 (e.g., one or more cameras), one or more position sensors 106 (e.g., a Global Navigation Satellite System (GNSS), a Global Positioning System (GPS), among others) one or more distance sensors 108, e.g., one or more radar sensors and/or one or more LIDAR sensors, one or more temperature sensors 110, one or more force sensors 112. According to at least one aspect, control system 251 may further include one or more memories 202, one or more map databases 204a, one or more mission databases 204b, one or more models 204c, one or more input/output interfaces 206 (e.g., user interfaces), and/or one or more (e.g., wireless and/or wired) transceivers 208, 210, 212. Exemplary components of the one or more input/output interfaces 206 include one or more displays, one or more touch screens, one or more microphones, one or more loudspeakers, one or more buttons and/or switches, etc.

The (e.g., wireless and/or wired) transceivers 208, 210, 212 may, in some aspects, be configured according to the same, different, or any combination thereof radio communication protocols or standards. By way of example, a (e.g., wireless and/or wired) transceiver (e.g., a first wireless transceiver 208) may be configured in accordance with a Short Range mobile radio communication standard (e.g., Bluetooth, Zigbee, among others). As another example, a (e.g., wireless and/or wired) transceiver (e.g., a second wireless transceiver 210) may be configured in accordance with a Medium or Wide Range mobile radio communication standard (e.g., 3G (e.g., Universal Mobile Telecommunications System—UMTS), 4G (e.g., Long Term Evolution—LTE), and/or 5G mobile radio communication standard in accordance with corresponding 3GPP ($3^{rd}$ Generation Partnership Project) standards, among others). As a further example, a (e.g., wireless and/or wired) transceiver (e.g., a third wireless transceiver 212) may be configured in accordance with a Wireless Local Area Network communication protocol or standard (e.g., IEEE 802.11, 802.11, 802.11a, 802.11b, 802.11g, 802.11n, 802.11p, 802.11-12, 802.11ac, 802.11ad, 802.11ah, among others). The one or more (e.g., wireless and/or wired) transceivers 208, 210, 212 may be configured to transmit signals via the antenna system over an air interface.

In some aspects, the one or more processors 102 may include an application processor 214, an image processor 216, a communication processor 218, a signal processor, and/or any other suitable processing device. Image acquisition device(s) 105 may include any number of image acquisition devices and components depending on the requirements of a particular application. Image acquisition devices 105 may include one or more image capture devices, e.g., cameras, CCDs (charge coupling devices, or any other type of image sensor).

In at least one aspect, the control system 251 may also include one or more data interfaces communicatively connecting the one or more processors 102 to other components of the control system 251. For example, one or more the data interfaces may be configured to exchange data in accordance with a fieldbus communication protocol or another in-machine communication protocol. For example, the one or more data interfaces may include a first data interface, e.g., including any wired and/or (e.g., wireless and/or wired) first link 220 or first links 220 configured to transmit image data that the one or more image acquisition devices 105 acquire to the one or more processors 102 (e.g., to the image processor 216). For example, the one or more data interfaces may include a second data interface, e.g., including any wired and/or (e.g., wireless and/or wired) second link 222 or second links 222 configured to transmit radio transmitted data that the (e.g., wireless and/or wired) transceivers 208, 210, 212 may acquire to the one or more processors 102, e.g., to the communication processor 218. For example, the one or more data interfaces may include a third data interface 224, e.g., including any wired and/or (e.g., wireless and/or wired) third link 224 or third links 224, coupled to the one or more position sensor 106 and/or to the one or more distance sensors 108 and/or to the one or more temperature sensors 110 and/or to the one or more force sensors 112.

Such data transmissions (e.g., exchange) may also include communications (e.g., one-way or two-way) between the machine 150 and one or more other (target) machines in an environment of the machine 150 (e.g., to facilitate coordination of the task performance by, e.g., including the navigation of, the machine 150 in view of or together with other (e.g., target) machines in the environment of the machine 150), or even a broadcast transmission to unspecified recipients in a vicinity of the transmitting machine 150.

One or more of the transceivers 208, 210, 212 may be configured to implement the group communication protocol (e.g., including a data exchange protocol, e.g., a wireless data exchange protocol and/or a wired data exchange protocol), and optionally one or more other communication protocols. In some aspects, the group communication protocol may include a proprietary (e.g., wireless and/or wired) communication protocol or may be a proprietary (e.g., wireless and/or wired) communication protocol. In some aspects, the group communication protocol may be an application layer protocol, e.g., defining the format, syntax, and/or semantics of the load part of a message generated in accordance with a (e.g., wireless and/or wired) communication protocol.

Each processor 214, 216, 218 of the one or more processors 102 may include various types of hardware-based processing devices. Exemplary components of each processor 214, 216, 218 may include: a microprocessor, pre-processors (such as an image pre-processor), graphics processors, a central processing unit (CPU), support circuits, digital signal processors, integrated circuits, memory, or any other types of devices suitable for running applications and for sensor data processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when a processor (e.g., the one or more processors 102) executes, controls the operation of the system, e.g., of the control system 251. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

In some aspects, the control system 251 may further include components such as a speed sensor (e.g., a speedometer) for measuring a speed of the machine 150. The control system may also include one or more accelerometers (either single axis or multiaxis) (not shown) for measuring accelerations of the machine 150 along one or more axes. The control system 251 may further include additional sensors or different sensor types such as an ultrasonic sensor, a thermal sensor, one or more radar sensors 110, one or more LIDAR sensors 112 (which may be integrated in the head lamps of the machine 150), and the like.

The one or more memories 202 may store data, e.g., in a database or in any different format. The one or more processors 102 may be configured to process sensory information (also referred to as sensor data), such as images, radar signals, depth information from LIDAR, temperature values or stereo processing of two or more images) of the environment of the machine 150 together with position information, such as a GPS coordinate, a machine's ego-motion, etc., to determine a current location of the machine 150 relative to the known landmarks, and refine the determination of the machine's location. Certain aspects of this technology may be included in a localization technology such as a mapping and routing model.

The map database 204 may include any type of database storing (digital) map data for the machine 150, e.g., for the control system 251. The map database 204 may include data relating to the position, in a reference coordinate system, of various (e.g., outdoor or indoor) items, including roads, buildings, walls, topographic features (e.g., stairs), geographic features, rooms, points of interest, spatial information of a task, docks, etc. In some aspects, a processor of the one or more processors 102 may download (e.g., some or all) information of the map database 204 over a (e.g., wireless and/or wired) data connection to a communication network (e.g., over a cellular network and/or the Internet, etc.). In some aspects, a processor of the one or more processors 102 may be configured to determine, e.g., form and/or update, (e.g., some or all) information of the map database 204, e.g., based on sensing the environmental condition by the one or more sensors 104. In some aspects, the map database 204 may store a sparse data model including polynomial representations of the environment of the machine 150.

In some aspects, the control system 251 may include a mission database. Exemplary components of the mission database may include mission data, a task list, a task status, a task allocation, achievement parameters, target results, etc. Illustratively, the mission database may provide and/or store information about a mission of the team, to which the machine 150 is affiliated. Some information of the mission database (e.g., some mission data) may be provided to the machine 150, e.g., one or more other members of the team and/or a central mission controlling authority may provide the information of the mission database. The machine 150 may provide some information of the mission database (e.g., some mission data), e.g., to one or more other members of the team and/or to a central mission controlling authority. The machine 150 may update and/or form some information of the mission database (e.g., some mission data), e.g., in accordance with a status of the mission and/or based on a sensing result of the machine 150.

Furthermore, the control system 251 may include a task performance model 204b, e.g., an automated system may implement the task performance model 204b. By way of example, the control system 251 may include (e.g., as part of the task performance model) a computer implementation of a formal model of the machine or its environment. By way of example, the control system 251 may include (e.g., as part of the task performance model) a safety performance model, a task interpretation model and/or a machine control model. A task performance model may be or include a mathematical model formalizing an interpretation of applicable task performance policies, safety policies, operation policies, mission data, etc., e.g., being applicable to autonomous machines. It is noted that one or more of the detailed components of the task performance model may be implemented monolithically or separately from each other, e.g., by separate applications that the one or more processors may execute.

For example, the safety performance model may be configured to achieve, e.g., three goals: first, the interpretation of safety policies should be sound in the sense that it complies with how humans interpret the safety policies; second, the interpretation should lead to a useful task performance, meaning it will lead to an agile task performance rather than an overly-defensive task performance which inevitably would confuse other agents (e.g., humans and/or machines) and will obstruct accomplishing the mission and in turn limit the scalability of system deployment; and third, the interpretation should be efficiently verifiable in the sense that it can be rigorously proven that the autonomous machine correctly implements the interpretation of the safety policies. The safety performance model, illustratively, may be or include a mathematical model for safety assurance that enables identification and performance of proper responses to dangerous situations such that self-perpetrated accidents can be avoided.

For example, the task interpretation model may be configured to determine a formal formulation of performance steps the machine may perform, e.g., based on information about one or more tasks of the mission allocated to the machine and/or based on the target performance. The conversion may be configured to lead to an efficient task performance and to a result, which meets the target performance as best as possible, e.g., to accomplish the task.

For example, the machine control model may be configured to determine useful actions that the machine may take leading to a useful task performance, e.g., based on the performance steps and/or the model of the machine and/or its environment. For example, the machine control model may generate the control instructions based on a model of the kinetic chain of the machine, the available effectors of the machine, the reachable position of the machine, etc.

The control system 251 may generate data to control or assist to control the engine control unit (ECU) and/or other components of the machine 150 to directly or indirectly control the driving of the machine 150.

In some aspects, the control system 251 may include a driving device 240 configured to drive one or more actuators of the autonomous machine, e.g., one or more actuators of the kinematic chain of the autonomous machine 150 and/or one or more actuators of the one or more propulsion devices 118. For example, the driving device 240 may include one or more amplifiers 240a and/or one or more energy storages 240b. Examples of energy storages 240b may include any storage capable to storing energy (in a certain form, e.g., such as electrically, magnetically, chemically, and the like) and convert the stored energy in electrical power. Examples of the amplifiers 240a may include any voltage-to-voltage converter providing an operation voltage of the one or more actuators based on the electrical supply power and based on a control signal received from the one or more processors 102.

As described above, the machine 150 may include the control system 251 as also described with reference to FIG. 2.

The machine 150 may include the one or more processors 102 e.g. integrated with or separate from an engine control unit (ECU) of the machine 150.

The control system 251 may in general generate data to control or assist to control the ECU and/or other components of the machine 150 to directly or indirectly control the driving of the machine 150.

Although the following aspects will be described in association with the above detailed models, any other model may be provided in alternative implementations.

Figure 3:
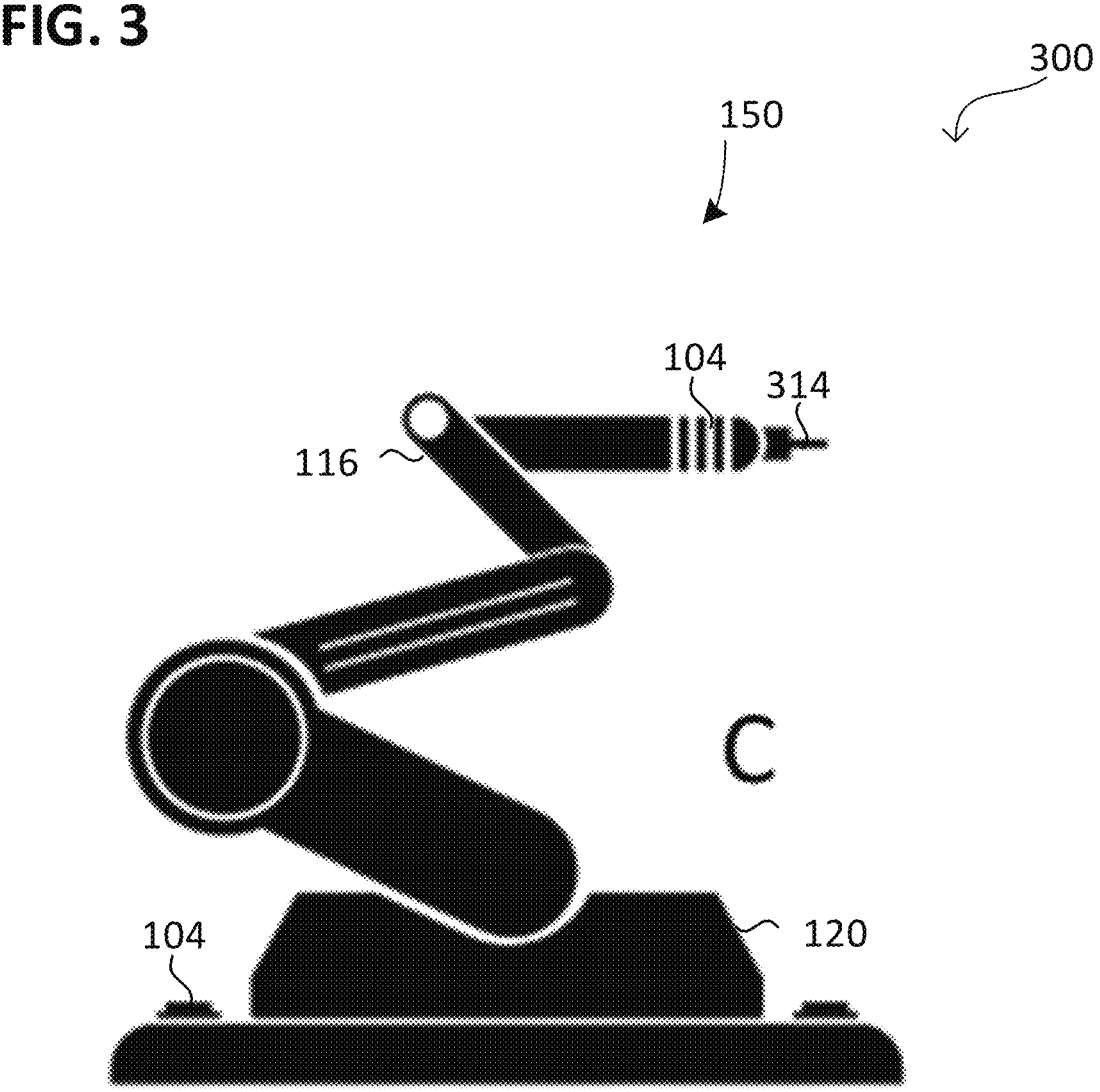
FIG. 3 shows an example of a machine in accordance with various aspects of the present disclosure.
Figure 4:
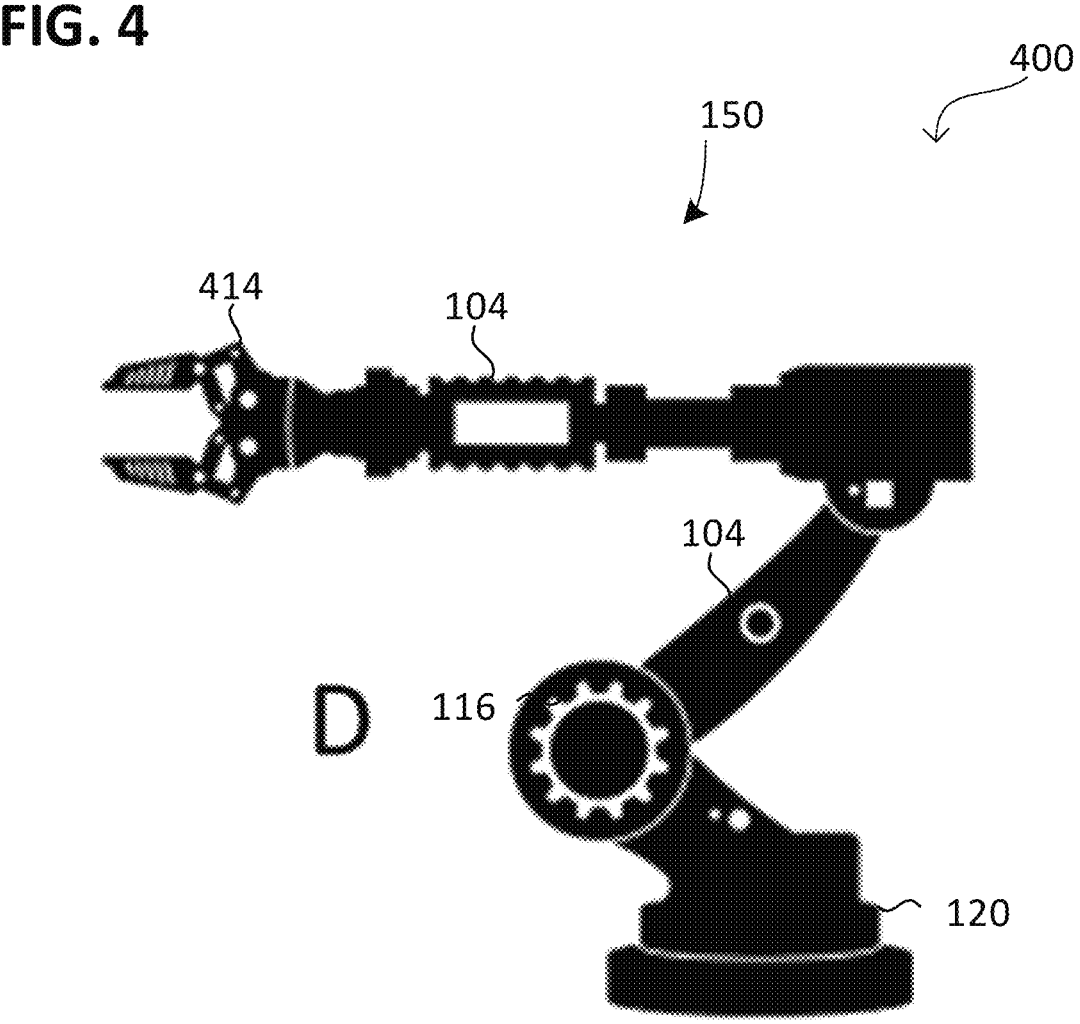
FIG. 4 shows an example of a machine in accordance with various aspects of the present disclosure.

FIGS. 3 and 4 show further examples of autonomous machines 150. FIG. 3 shows a further example of an autonomous machine 150 in accordance with various aspects 300 of the present disclosure, e.g., being configured in accordance with aspects 100 or 200. For example, autonomous machine 150 may include one or more processors 102 (not shown); one or more one or more sensors 104; one or more effectors 114; one or more kinetic chains 116 (e.g., holding an effector); and/or one or more communication devices 120. Machine 150 may be stationary and include a welding device 314 as effector 114.

FIG. 4 shows a further example of an autonomous machine 150 in accordance with various aspects 400 of the present disclosure, e.g., being configured in accordance with aspects 100 or 200. Autonomous machine 150 may include one or more processors 102 (not shown); one or more one or more sensors 104; one or more effectors 114; one or more kinetic chains 116 (e.g., holding an effector); and/or one or more communication devices 120. Machine 150 may be stationary and include a grabber device 414 as effector 114.

Herein, reference is made to various methods', processing chains, operations, computations, logical relations, models and functions, e.g., with respect to autonomous machines. It can be understood that the references made may be analogously apply to a controller and/or code segments implementing the methods, processing chains, operations, computations, logical relations, models and functions.

Figure 5:
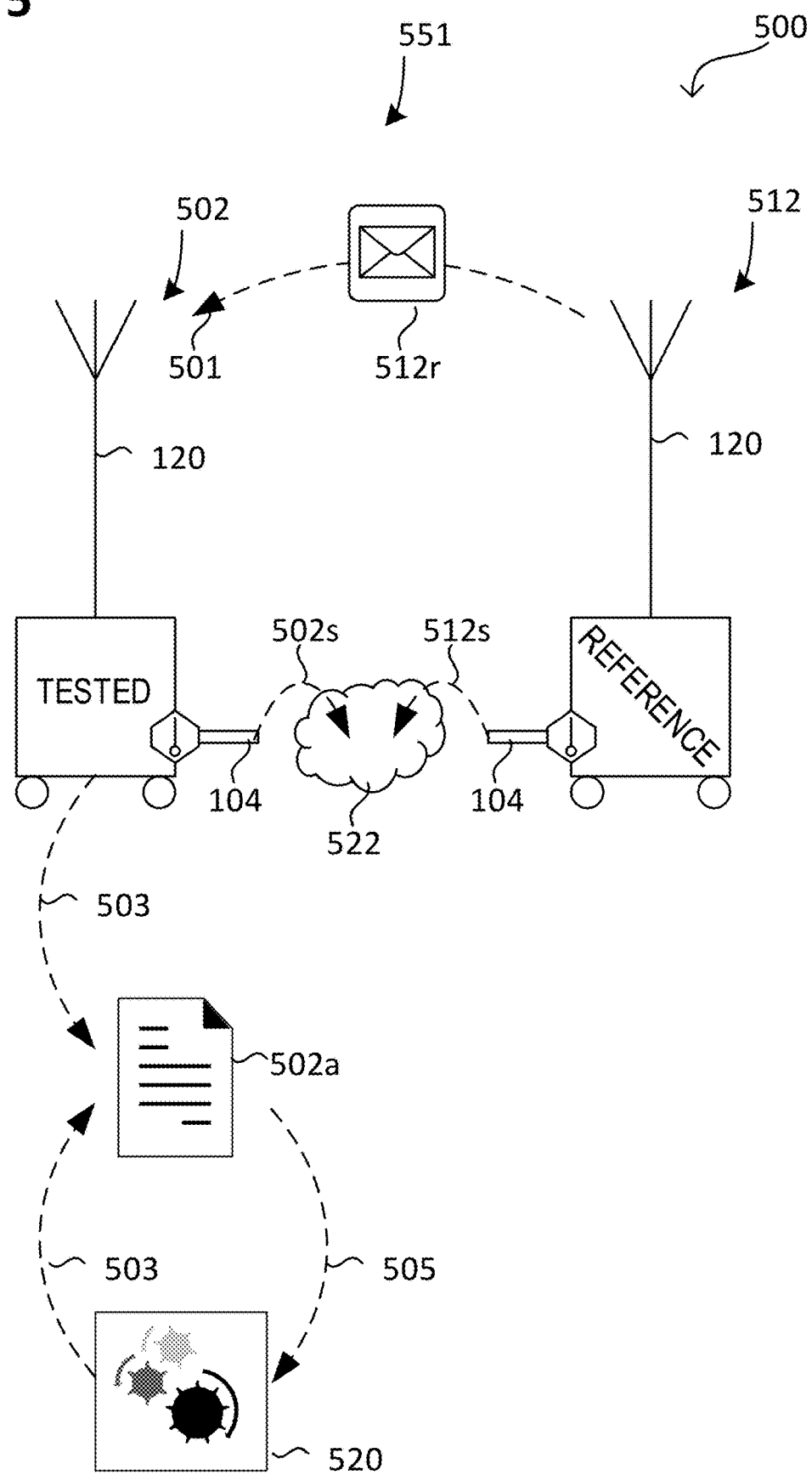
FIG. 5 shows a method in accordance with various aspects of the present disclosure in a schematic diagram.

FIG. 5 shows a method 551 in accordance with various aspects 500 of the present disclosure, in a schematic communication diagram, which may be configured in accordance with aspects 100 to 400 and/or may be implemented by one or more autonomous machines 150, namely a first autonomous machine 502 (also referred to as monitored machine or to as machine under test) and/or a second autonomous machine 512 (also referred to as reference machine), e.g., by the one or more processors 102 thereof and/or by code segments executed by the one or more processors 102 thereof.

The method 551 includes, in 501, receiving a message 512r from the reference machine 512 in accordance with a (e.g., wireless and/or wired) communication protocol. The message 512r (also referred to as result message) may include a result (also referred to as reference result) of a sensing process 512s (also referred to as reference sensing process). The references made to two autonomous machines exchanging a result of one or more sensing processes as reference result (also referred to as sensor data exchange) may be understood to apply analogously to more than two autonomous machines.

According to various aspects, the reference machine 512 may be configured to perform the reference sensing process 512s, e.g., using at least one sensor (also referred to as at least one reference sensor) of the one or more sensors 104 of the reference machine 512. For example, the at least one reference sensor may be complementary to at least one monitored sensor of the monitored machine 502.

According to various aspects, the reference machine 512 may be configured to generate the result message 512r in accordance with the (e.g., wireless and/or wired) communication protocol and/or to transmit the result message 512r in accordance with the (e.g., wireless and/or wired) communication protocol, e.g., to the monitored machine 502. For example, the reference machine 512 may be configured to address the result message 512r to the monitored machine 502 and/or broadcast the result message 512r, e.g., to a team including the monitored machine 502 and/or the reference machine 512.

Optionally, the result message 512r may include information indicating a reliability of the reference result (also referred to as flag). For example, the reference machine 512 may be configured to perform a self-assessment prior to performing the reference sensing 512s (also referred to as earlier self-assessment). For example, the flag may be based on the result of the earlier self-assessment of the reference machine 512.

The method 551 includes further, in 503, determining an assessment 502a of the monitored machine 502 (also referred to as self-assessment 503). According to various aspects, the self-assessment 503 may be based on the result message (in this case, also referred to as sharing based self-assessment 503), e.g., based on the reference result and based on a result of a second sensing process 502s (also referred to as monitored sensing process). The monitored machine 502 may be configured to perform the monitored sensing process, e.g., using at least one sensor of the one or more sensors 104 of the monitored machine 502 (also referred to as at least one monitored sensor). For example, method 551 includes, in 503, determining the assessment 502a of the at least one monitored sensor of the monitored machine 502 based on the reference result and based on a result of the monitored sensing process 502s (also referred to as monitored result).

Additionally or alternatively to the sharing based self-assessment 503 (e.g., being based on the monitored result and the reference result), the self-assessment 503 may be based on an assessment estimation model 520 (also referred to as estimation based self-assessment 503). The assessment estimation model 520 may be configured to provide the assessment 502a (also referred to as estimated assessment, e.g., including an estimated sensor failure or need for calibration) based one or more actual conditions of the monitored machine 502. Examples of the one or more actual conditions may include one or more environmental conditions (e.g., temperature, pressure, and the like) of the monitored machine 502 and/or the operational condition of the monitored machine 502. For example, the assessment estimation model 520 may be configured to output the estimated assessment based on the one or more environmental conditions (e.g., temperature, pressure, and the like) of the monitored machine 502 and/or the operational condition of the monitored machine 502. Illustratively, the assessment estimation model 520 may allow to perform the self-assessment 503 without the assistance of any other autonomous machine. For example, the operational condition may represent the condition when performing the task. For example, the environmental condition may represent the scene, in which the monitored machine 502 is disposed.

Optionally, the method may include, in 505, updating (e.g., training) or forming the assessment estimation model 520 based on the result of the sharing based self-assessment 503 and based on the one or more actual conditions of the monitored machine 502. Illustratively, training the assessment estimation model 520 may improve the capability to perform the self-assessment 503 without the assistance of any other autonomous machine. For example, assessment estimation model 520 does not necessarily be a trained model, e.g., if being a formal model.

The reference sensing process 512s and the monitored sensing process 502s may be configured to provide comparable results. According to various aspects, the reference sensing process 512s and the test sensing process 502s may be configured to use the same type of sensors. According to various aspects, the reference sensing process 512s and the test sensing process 502s may be configured to provide the same type of results.

According to various aspects, the reference sensing process 512s and the test sensing process 502s may be configured to sense the same environmental property, e.g., in the same vicinity. For example, reference sensing process 512s and the test sensing process 502s may be configured to output the same type of information about the environmental property.

According to various aspects, the at least one reference sensor and the at least one monitored sensor may be configured to sense the same environmental property. According to other aspects, the at least one reference sensor may be configured to sense a first environmental property and the at least one monitored sensor may be configured to sense a second environmental property being different from the first environmental property.

According to various aspects, the assessment 502a may be an assessment 502a of the monitored machine 502, e.g., of the at least one monitored sensor. For example, the method may include determining multiple assessments 502a of the monitored machine 502, of which each is related to another senor of the monitored machine 502. Examples of the assessment 502a may include: a health score, a reliability assessment, a confidence assessment, a trust assessment, and the like. For example, the reliability assessment may indicate the reliability of the monitored machine 502, e.g., the at least one monitored sensor.

In various aspects, a sensing process, that the autonomous machine 150 performs, may or may not be contactless, e.g., when the sensing process includes that the autonomous machine 150 physically contacts the (e.g., solid) object to be sensed. For example, the sensing process may include to sense the result of an action taken by the autonomous machine 150, e.g., the result of processing the object (e.g., a workpiece) by the autonomous machine 150. In an exemplary scenario, the tool of the monitored machine 502 includes a screw-driver to tighten a screw of the object, and the monitored result represents the torque of the screw-driver transferred to the screw, e.g., during a tighten operation. In this exemplary scenario, the method 551 may include determining any autonomous machine, which includes a screw-driver as tool, e.g., being in the vicinity of the monitored machine 502 and/or being a member of a team of the monitored machine 502, as reference machine 512. The reference sensing process may include sensing, by the reference machine 512, the torque transferred to the screw.

In a more general scenario, the method 551 includes that two autonomous machines 150 may swap their tasks and task performing configuration, e.g., when being neighboring autonomous machines 150. In this general scenario, each autonomous machine 150 of the two autonomous machines acts as reference machine 512 for the other autonomous machine of the two autonomous machines and generates a reference result for the other autonomous machine (illustratively, the sensing results are shared back). The method includes comparing these reference results against the sensing result of the previous operations and determining the deviation therefrom. The method may include determining the deviation based on an average or a simple flag to determine that the respective operation fell with a normal of the last 20 similar operations. Alternatively or additionally, determining the deviation may be based on one or more other measures, for example, a general quality of service, conformance with a safety model, or other diverse measure for assessment. In this case, the method 551 may include determining the sensor and operation of the monitored machine 502 as working fine. If the deviation is not acceptable, the method 551 may include determining the sensors (or potentially the controller) as being faulty or in need of maintenance, e.g., such as calibration.

In an illustrative example, the monitored sensor may encounter a (e.g., dynamic) sensing uncertainty due to one or more of the following: specific environment conditions (e.g., beyond the working conditions of the sensor), environmental noise, calibration loss, and/or sensor degradation with age. The self-assessment 503 minimizes the requirement of periodic preventive maintenance of individual autonomous machines. Illustratively, various aspects are based on factoring in the collaborative interactive nature between the two or more autonomous machines and the interaction between the infrastructure and the autonomous machines. For example, the self-assessment 503 improves handling of sensory failures.

As an optimization technique, multiple machines may assess the time criticality of functions they are responsible for and share this within the (working) group of local machines. Comparing these parameters, the machines may swap locations and functions in order to ensure an optimal configuration of machines with the necessary functions to back each other up and to also ensure that a machine with a time critical function has a backup machine within proximity so as to minimize potential safety or quality issues. These learned configurations may become a heuristic model for future teams in practice, e.g., using the prior teams success or failure as basis for optimization.

Obtaining real-time environmental, material characteristics, etc., may be crucial to perform appropriate fail-over to avoid any factory execution pipeline disruption. Additionally, sensory, functional, and/or performance degradation issues involving interaction of one or more autonomous machines 150 with other machines 150 or with the infrastructure may be hard capture via traditional silo'ed predictive maintenance.

Figure 6:
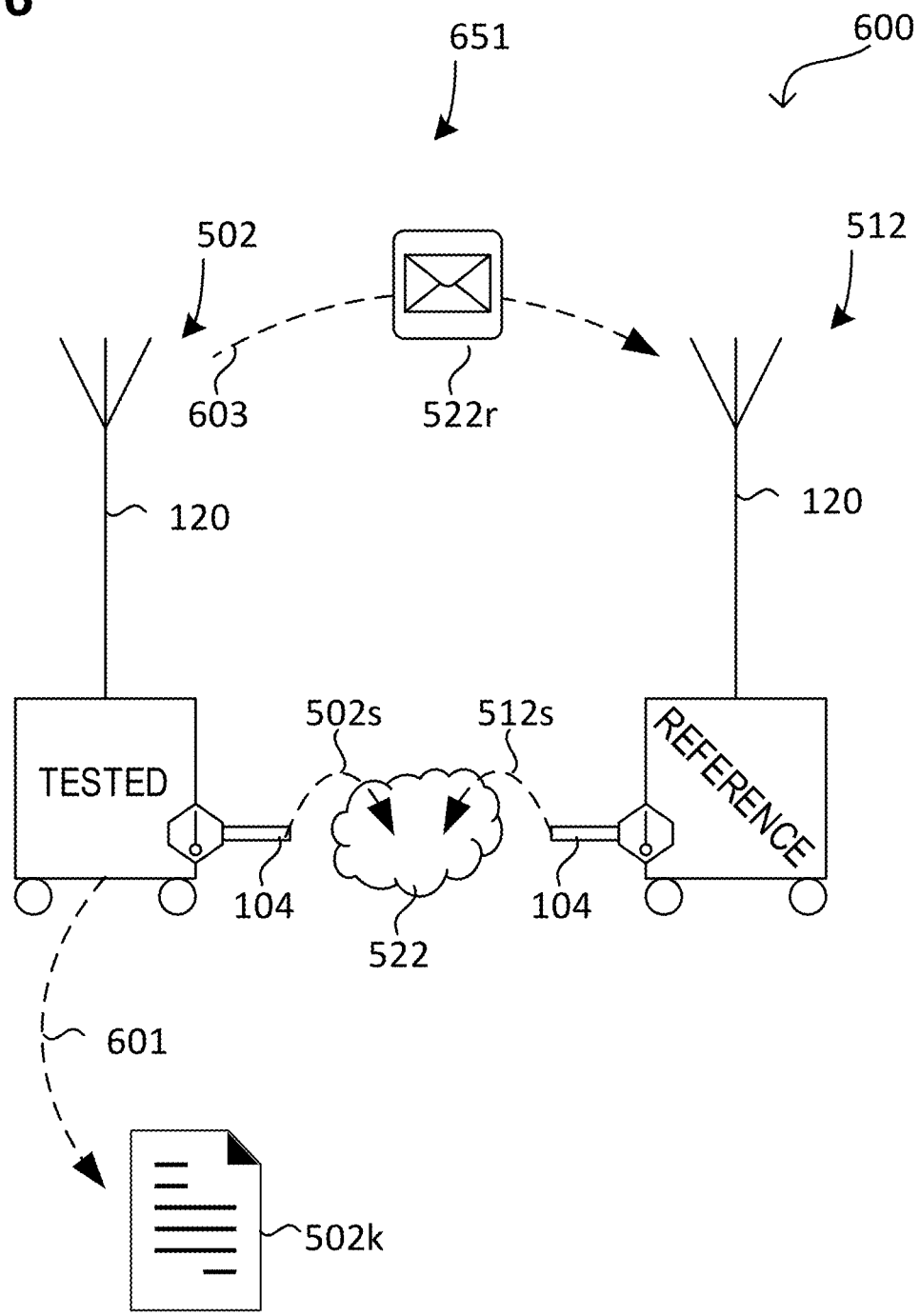
FIG. 6 shows a method in accordance with various aspects of the present disclosure in a schematic diagram.

FIG. 6 shows a method 651 in accordance with various aspects 600 of the present disclosure, in a schematic communication diagram, which may be configured in accordance with aspects 100 to 500 and/or that the one or more autonomous machines 150 may implement, namely the monitored machine 502 and/or the reference machine 512, e.g., by the one or more processors 102 thereof and/or by code segments executed by the one or more processors 102 thereof.

The method 651 includes in, 601, determine, if the monitored sensing process 502s of the monitored machine 502 is not fulfilled 502k (also referred to as uncertainty determination), e.g., by comparing the result of the monitored sensing process 502s with a predefined result. For example, the reliability criterion 502k may be fulfilled, when the result of the monitored sensing process 502s meets or is close to the predefined result. The monitored machine 502 may be configured to perform the monitored sensing process, e.g., using the at least one monitored sensor. For example, the predefined result may represent an optimum result or may include a range of results, which are acceptable. For example, the predefined result may be stored by the monitored machine 502.

The method 651 includes in, 603, generating, when the reliability criterion is not fulfilled, a message 522r (also referred to as request message 522r) to the reference machine 512 in accordance with the (e.g., wireless and/or wired) communication protocol. The request message 522r may include a request (also referred to as sharing request) to provide the reference result to the monitored machine 502. The monitored machine 502 may be configured to generate and/or transmit the request message 522r in accordance with the (e.g., wireless and/or wired) communication protocol, e.g., to the reference machine 512. For example, the monitored machine 502 may be configured to address the request message 522r to the reference machine 512 and/or to broadcast the request message 522r.

According to various aspects, the reference machine 512 may be configured to perform the reference sensing process 512s, e.g., using the at least one reference sensor and/or in response to receiving the request message 522r. The reference machine 512 may be configured to generate the result message 512r in accordance with the (e.g., wireless and/or wired) communication protocol, as detailed above. The result message 512r may include the reference result of the reference sensing process 512s as described above.

Figure 7:
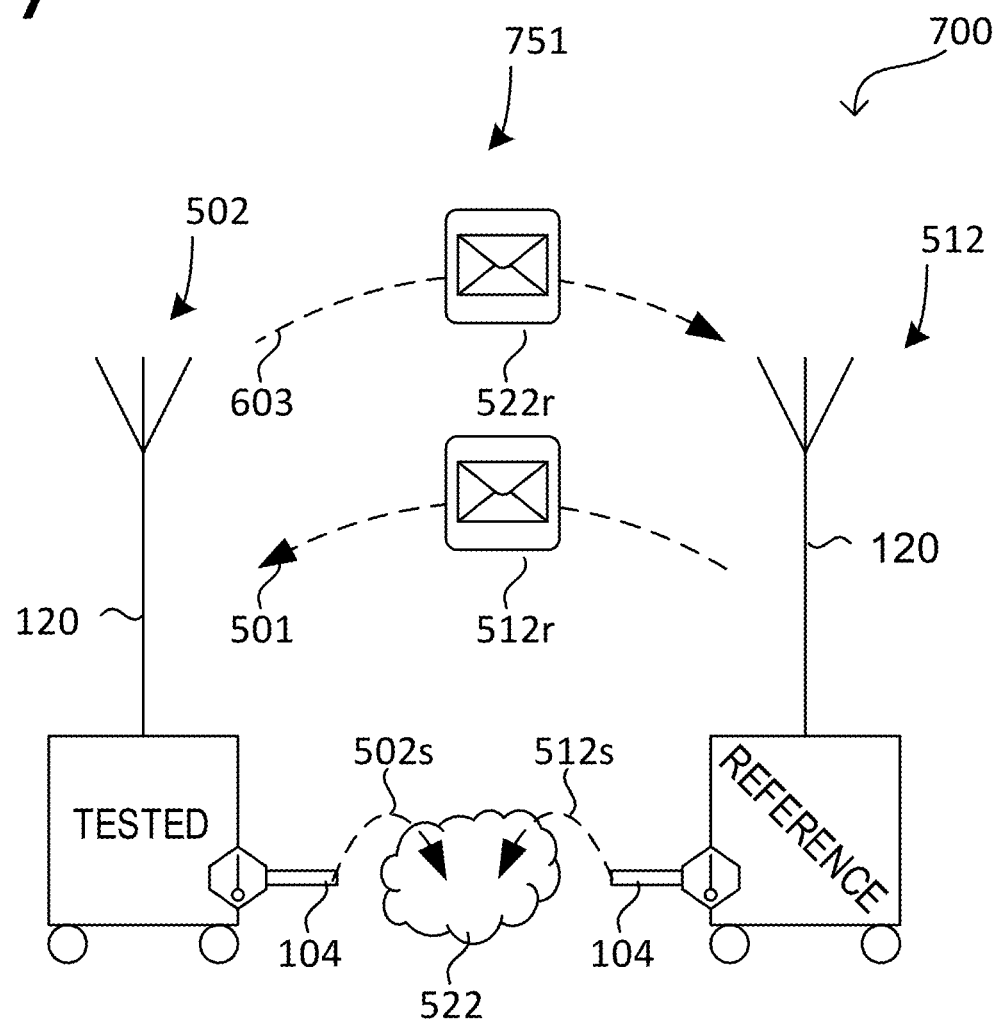
FIG. 7 shows a method in accordance with various aspects of the present disclosure in a schematic diagram.

FIG. 7 shows a method 751 in accordance with various aspects 700 of the present disclosure, in a schematic communication diagram, which may be configured in accordance with aspects 100 to 600 and/or which may be implemented by the reference machine 512, e.g., by the one or more processors 102 thereof and/or by code segments executed by the one or more processors 102 thereof. It may be noted that one or more machines, which provide the reference machine 512, may change over time, e.g., based on one or more tasks. For example, a machine may be selected as reference machine 512 to guarantee similarities of both tasks and environmental data.

The method 651 includes in, 501, receiving the request message 522r from the monitored machine 502 in accordance with the (e.g., wireless and/or wired) communication protocol. As detailed above, the request message 522r may include the request to provide the reference result to the monitored machine 502.

According to various aspects, the monitored machine 502 may be configured to transmit the request message 522r in accordance with the (e.g., wireless and/or wired) communication protocol, e.g., to the reference machine 512. For example, the monitored machine 502 may be configured to address the request message 522r to the reference machine 512 and/or to broadcast the request message 522r.

The method 651 includes in, 601, generating the result message 512r to the monitored machine 502 in accordance with the (e.g., wireless and/or wired) communication protocol. As detailed above, the result message 512r may include the reference result provided by the reference machine 512. Optionally, method 751 includes in, 701, transmitting, the result message 512r in accordance with the (e.g., wireless and/or wired) communication protocol, e.g., to the monitored machine 502. For example, the method 751 includes in, 701, addressing the result message 512r to the monitored machine 502 and/or broadcasting the result message 512r.

Figure 8:
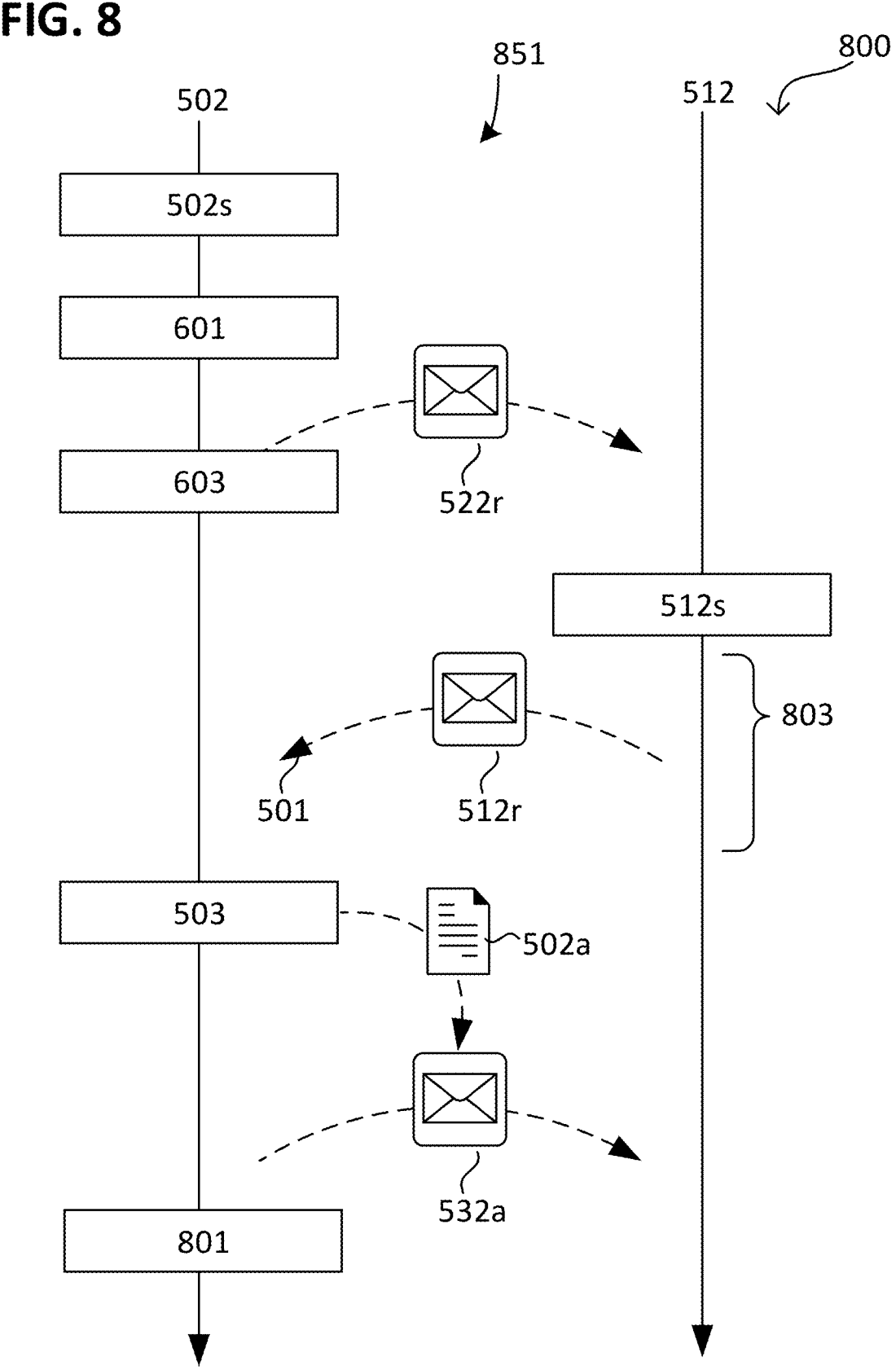
FIG. 8 shows a method in accordance with various aspects of the present disclosure in a schematic flow diagram.

FIG. 8 shows a system 851 in accordance with various aspects 800 of the present disclosure, in a schematic flow diagram, which may be configured in accordance with aspects 100 to 700 and/or which may be implemented by one or more autonomous machines 150, namely the monitored machine 502 and/or the reference machine 512, e.g., by the one or more processors 102 thereof and/or by code segments executed by the one or more processors 102 thereof. Method 851 may include the aspects as detailed above with respect to methods 551, 651, 751.

Optionally, method 851 includes, in 801, generating a message 532a (also referred to as assessment message) in accordance with a (e.g., wireless and/or wired) communication protocol and/or transmit the message 532a in accordance with the (e.g., wireless and/or wired) communication protocol to the reference machine 512. The assessment message 532a may include the assessment 502a. For example, method 851 includes, in 801, addressing the result message 512r to the monitored machine 502 and/or broadcast the result message 512r.

It may be understood that more than two autonomous machines 150 may exchange 803 a result of a sensing process as reference result (also referred to as sensor data exchange 803).

Figure 9:
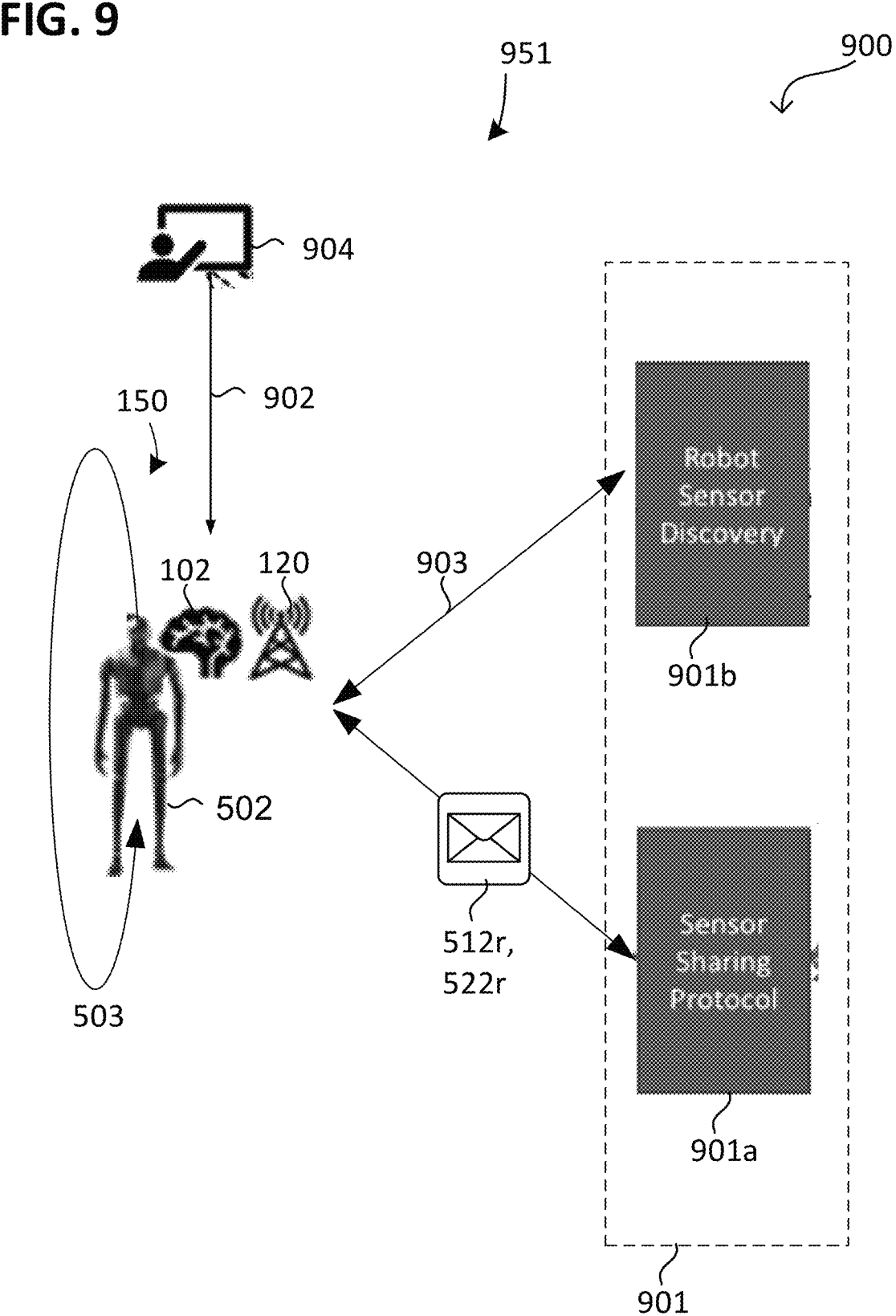
FIG. 9 shows a system in accordance with various aspects of the present disclosure, in a schematic diagram.

FIG. 9 shows a system 951 in accordance with various aspects 900 of the present disclosure, in a schematic diagram, which may be configured in accordance with aspects 100 to 800. System 951 may include the monitored machine 502 and optionally one or more reference machines 512 as detailed later.

System 951 may include the group communication protocol 901 including a sensor sharing protocol 901a and/or a sensor discovery protocol 901b (also referred to as robot sensor discovery or as sensor discovery protocol). The sensor sharing protocol 901a may define rules that indicate the format, syntax, semantics and/or synchronization of data exchange via messages related to the one or more sensing processes (also referred to as sharing), e.g., via the result message 512r and/or the request message 522r (illustratively, including a sharing request).

The sensor discovery protocol 901b may be configured to provide information regarding one or more available sensors in the team. The sensor discovery protocol 901b may define rules that indicate the format, syntax, semantics and/or synchronization of the data exchange via messages related to the preparation of sharing, e.g., data exchange for sensor discovery. For example, the sensor discovery may include determining, if an autonomous machine 150 being member of the team includes a sensor that is capable for determining the reference result. For example, the sensor discovery may include determining, which autonomous machine 150 being member of the team includes a sensor that is capable for determining the reference result. For example, the monitored machine 502 may be configured to determine, in accordance with the sensor discovery protocol 901b, one or more members of the group that include a sensor being configured to determine the reference result (also referred to as sensor discovery).

The group communication protocol 901 may be implemented by each autonomous machine 150 being member of the team (group of autonomous machines) including the monitored machine 502 and/or one or more reference machines 512. For example, the group communication protocol 901 may be implemented by the one or more processors 102 thereof and/or by code segments executed by the one or more processors 102.

The one or more processors 102 may be configured to trigger (e.g., initiate) the self-assessment 503, when (e.g., in response to) determining an event (also referred to as anomaly event or as uncertainty). Examples of the anomaly event may include: a machine anomaly, a group affiliation change, a maintenance related event, an environmental change, a scheduled event, an operator instruction. Examples of the machine anomaly (also referred to as anomaly relating to the autonomous machine 150) may include: a sensor anomaly of the autonomous machine 150 (e.g., the monitored machine 502), and an operation anomaly of the autonomous machine 150 (e.g., the monitored machine 502). Examples of the group affiliation change may include the autonomous machine 150 (e.g., the monitored machine 502) joining a team or leaving a team. Examples of an environmental change may include a change of one or more environmental conditions (e.g., lighting, temperature, air pressure), to which the autonomous machine 150 (e.g., the monitored machine 502) is exposed.

The one or more processors 102 may be configured to determine the sensor anomaly, when a sensor of the autonomous machine 150 (e.g., the monitored machine 502) provides abnormal data or abnormal behavior, e.g., providing unexpected data, high noise, etc. For example, the one or more processors 102 may be configured to determine the sensor anomaly based on a stored result of one or more previous task performances, on one or more previous sensing results, and/or on an output of the one or more models 204c. The same may apply analogously to the operation anomaly, e.g., when the operation of the autonomous machine 150 (e.g., the monitored machine 502) is abnormal or provides an abnormal result.

The maintenance related event may include a point of time related to a maintenance of the autonomous machine 150 (e.g., the monitored machine 502), e.g., before and/or after the maintenance of the autonomous machine 150. For example, a time difference between the point of time related to the maintenance and the time, the maintenance is performed, may be stored, e.g., by the one or more memories 202 of the autonomous machine 150.

The one or more processors 102 may be configured to obtain the operator instruction based on a message 902 (also referred to as operator message) from an operator device 904, the operator message 902 including the operator instruction. The operator instruction may include the instruction to perform the self-assessment 503. For example, the operator device 904 may include a user interface (e.g., human-machine interface), e.g., including a keyboard, a display, and/or a mouse, and the like. For example, the operator device 904 may be configured to be operated by a human operator (also referred to as user). In various aspect, the operator device 904 may implement the central mission controlling authority. In other examples, an autonomous machine 150 may be configured to implement the central mission controlling authority.

Figure 10:
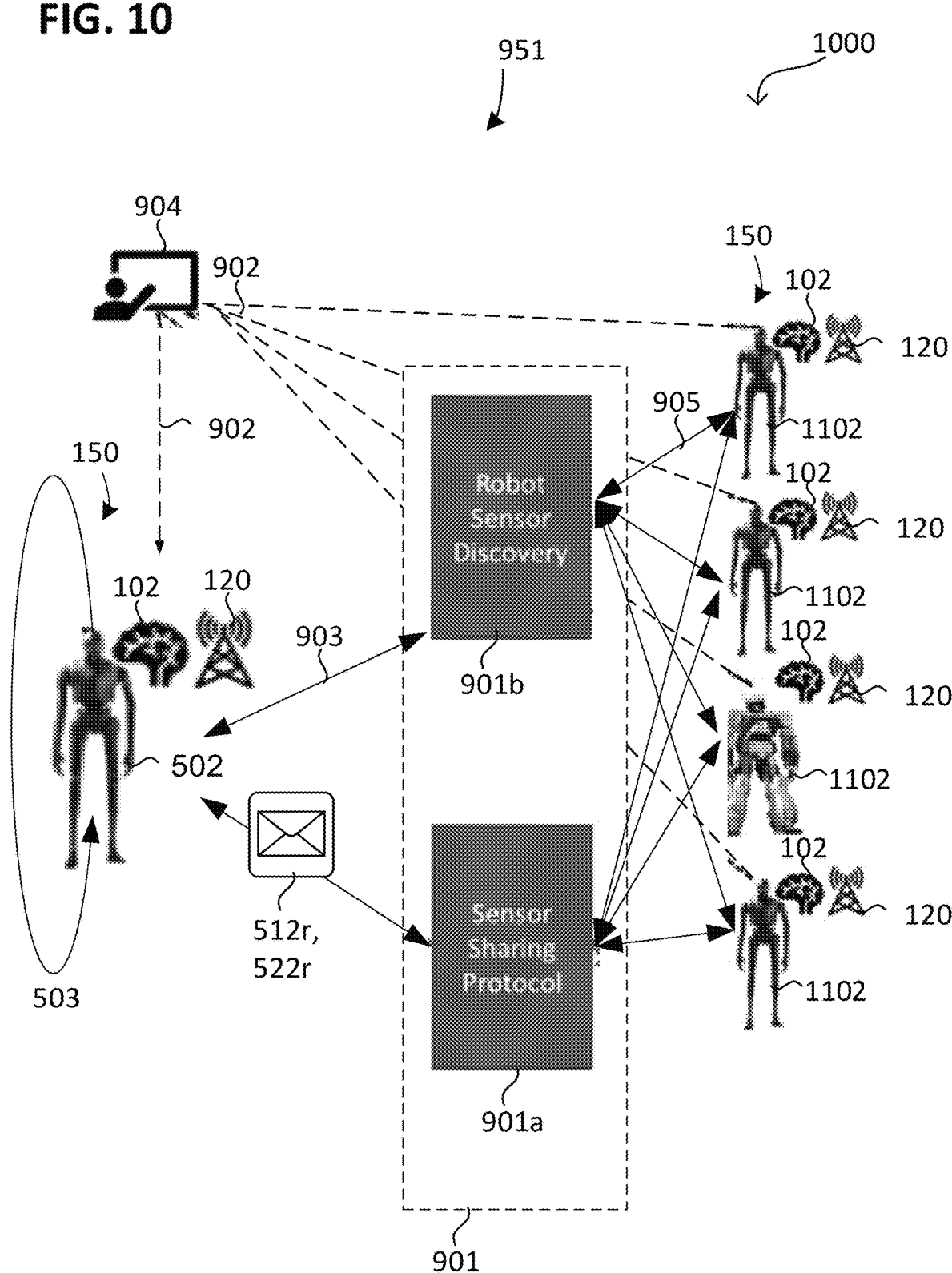
FIG. 10 shows a system in accordance with various aspects of the present disclosure, in a schematic diagram.

FIG. 10 shows a system 951 in accordance with various aspects 1000 of the present disclosure, in a schematic diagram, which may be configured in accordance with aspects 100 to 900. System 951 may include a group of autonomous machines 150 (also referred to as group or as team) including the monitored machine 502 and one or more further autonomous machines 1102, e.g., including the reference machine 512 to be determined. According to various aspects, all members 150 of the team may be of the same type of autonomous machines (also referred to as homogeneous team). In other aspects, the team may include at least two autonomous machines differing in their type from each other. For example, two autonomous machines 150 differing in their type from each other may differ from each other in at least one sensor, e.g., the sensor type, and/or in the number of sensors of a specific type, and/or in their tool.

As detailed above, the monitored machine 502 may be configured to perform the self-assessment 503. The self-assessment 503 may be based on a quantified uncertainty and may be configured to detect and/or estimate one or more unreliable sensors of the monitored machine 502 as assessment 502*a*.

The monitored machine 502 (e.g., the one or more processors 102 thereof) and optionally each of the further autonomous machines 1102 (e.g., the one or more processors 102 thereof) of the team may be configured to implement the sensor discovery protocol 901*b* to determine 903 one or more of the further autonomous machines 1102 of the team as reference machine 512.

The monitored machine 502 (e.g., the one or more processors 102 thereof) and optionally each of the further autonomous machines 1102 (e.g., the one or more processors 102 thereof) of the team may be configured to implement the sensor sharing protocol 901*a* (also referred to as data exchange protocol) to share one or more sensing results as reference results (also referred to as reliable sensing data) as described above.

As detailed above, one or more members (e.g., each member) of the team (e.g., the monitored machine 502 and/or the reference machine 512) may implement the assessment estimation model 520. According to various aspects, the assessment estimation model 520 of an autonomous machine may be configured to determine one or more sensor failures of the autonomous machine. Additionally or alternatively, the autonomous machine may be configured to update (e.g., train) or generate the assessment estimation model 520, e.g., at least based on the operational condition and/or the operational condition. For example, assessment estimation model 520 does not necessarily be a trained model, e.g., if being a formal model.

In the following, reference will be made to various exemplarily aspects of the system 951, for demonstrative purposes, and is not intended to be limiting. The references made, e.g., to specific aspects, may analogously apply to the methods and processors as detailed herein.

Figure 11:
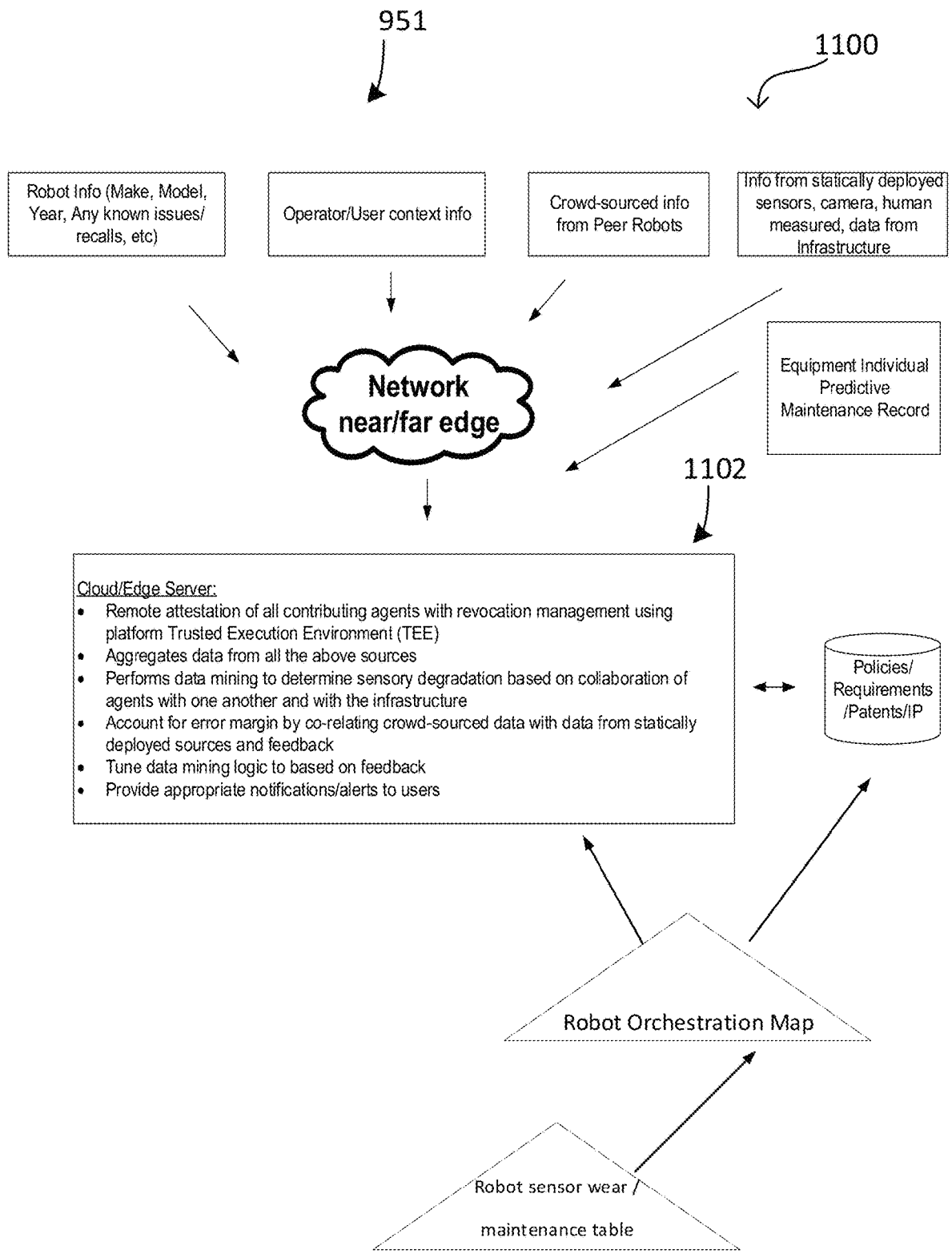
FIG. 11 shows a system in accordance with various aspects of the present disclosure, in a schematic diagram.

FIG. 11 shows a system 951 in accordance with various aspects 1100 of the present disclosure, in a schematic diagram, which may be configured in accordance with aspects 100 to 1000.

The system 951 may be configured to determine a quantified uncertainty for the self-assessment 503 to detect and/or estimate one or more unreliable sensors. The system 951 may include the sensor discovery protocol 901*b* to find one or more nearby autonomous machines (e.g., robots) with at least one complementary sensor. The system 951 may include the sensor sharing protocol 901*a* to share reliable sensing data.

The system 951 may optionally include a robot orchestration map, which ensures an optimal location of backup systems.

An example of an collaborative sensing along with the self-assessment may include: an autonomous agent 150 (e.g., a machine) that is uncertain of any sensory data may request for additional data (a second opinion as well) from one or more trusted peers (e.g., other autonomous machines). The estimative function may include an estimation about (e.g., answer) to one or more to the following: are my sensors good, are they accurate and/or reliable? Are my sensors consistent?

The monitored machine 502 may be configured to send one or more request messages 522*r* (e.g., including an SOS messages) to one or more further autonomous machines 1102 (e.g., robots) to provide data including a sensing result. Optionally, each autonomous machine 150 may be configured to determine a health score for the autonomous machine 150 (e.g., robot), e.g., as result of the self-assessment 503. The health score may be optionally contextual. The self-assessment 503 may include a triangulation (e.g., by more than one autonomous machine) cooperatively, e.g., to determine the reason for the anomaly event (illustratively, the underlying problem).

Optionally, the monitored machine 502 may be configured to leverage one or more further autonomous machines 1102 for error and decision making. The autonomous machines 150 (e.g., robots) may be configured to implement the self-change process (e.g., to change tools) as part of the sensor sharing protocol 901*a*.

The system 951 may optionally include a human/operator device 904 in the communication loop for determining an anomaly event (illustratively, an uncertainty) and for facilitating sharing one or more results of a sensing process. For determining an uncertainty of one or more autonomous machines 150 (e.g., robots) at least one (that is one or more) of the following may be implemented (e.g., depending on the scenario): an autonomous determination of uncertainty by the monitored machine 502 or an operator determination of the uncertainty (e.g., a human operator), e.g., based on monitoring sensors, behaviors or data regarding the task performance. Optionally, the system may be configured to score and/or weight the determined uncertainty, e.g., based on one or more of the following: a status of connection quality with an edge/server; a capability of the autonomous machine (e.g., robot) to self-evaluate (e.g., considering the environment during the mission, the need for real-time decision-making, etc.); and/or a sensor data quality from the nearby autonomous machines.

According to various aspects, system 951 may be configured to tabulate information about the one or more sensors 104 of the autonomous machines 150 (e.g., robot sensor wear) and/or the maintenance data of the autonomous machines 150 operating in proximity with each other. The tabulating may provide the ability to identify the highest potential for sensor failures. The result of the tabulating (also referred to as system table) may be communicated to a robot orchestration manager.

The robot orchestration manager may be configured to assign or exchange one or more autonomous machines 150, while in operation, to ensure that a duplicate or closest equivalent performing sensor (or respective robot) is in proximity to augment or replace a failure in operation. This may be beneficial, e.g., in particular, for sensors, which are high in wear indication and are in critical operation points, where extended delays may be costly, impact quality or safety.

According to various aspects, multiple robots of system 951 may be configured, while collaborating on a mission, to exchange data in accordance with the group communication protocol, e.g., to coordinate the task performance and/or to coordinate other information relating to the mission. According to various aspects, the group communication protocol may define a field in the data-packets for triggering a sensor data exchange 803. For example, the group communication protocol may be configured to trigger the sensor data exchange 803, when (e.g., right after) the data is parsed on individual robots 150.

According to various aspects, the system 951 may include at least one robot of the team that may facilitate the sharing process depending on weight and/or quality of the sensor data, e.g., by determining, if the received message has the sensor data exchange field activated. If the robots and/or sensors on the robots are heterogeneous, additional sensors may be used for covering a determined sensor uncertainty. For example, the self-assessment 503 may be based on more than one reference result, e.g., provided by more than one reference machine 512.

If the result of the self-assessment 503 indicates that a sensor failure is due to the environment (e.g., lighting condition or weather), the monitored machine 502 may intimate and/or broadcast a message (e.g., a warning message) to all robots 1102 to communicate the location of the monitored machine 502, which determined to have the sensor failure and/or at which the sensor failure occurred. This enables that the further robots in the vicinity of the monitored machine 502 may be cautious.

In various scenarios, the one or more processors (e.g., by the assessment estimation model 520) may be configured (e.g. trained or generated) to estimate the anomaly event (e.g., the sensor failure scenario). In various scenarios, the one or more processors (e.g., by safety performance model) may be configured (e.g., trained or generated) to estimate one or more precaution/mitigation actions to be taken by the autonomous machine 150, e.g., based on the result of the self-assessment 502 (e.g., indicating a sensor) and/or based on the respective estimated anomaly event (e.g., indicating a failure situation).

In various scenarios, the one or more processors may be configured to determine a sensor redundancy to be enabled on the robot 150, e.g., depending on the criticality and need (if it is feasible), e.g., if the critical sensors were estimated to fail.

The system 951 may include one or more servers 1102 (e.g., cloud and/or edge servers), which may be in communication with one or more autonomous machines 150 (e.g., the reference machine 512 and/or the monitored machine 502) and/or may be configured to provide one or more of the following functions:

Remote attestation of all contributing agents with revocation management using platform Trusted Execution Environment (TEE), Aggregation of data from all the above sources, Perform data mining to determine sensory degradation based on collaboration of agents with one another and with the infrastructure, Account for error margin by co-relating crowd-sourced data with data from statically deployed sources and feedback, Tune data mining logic based on feedback, Provide appropriate notifications and/or alerts to users, e.g., based on provisioned policies, Provide, e.g., based on observed error margin and/or sensory degradation, contextual recommendation to compensate and/or mitigate the degradation.

Figure 12:
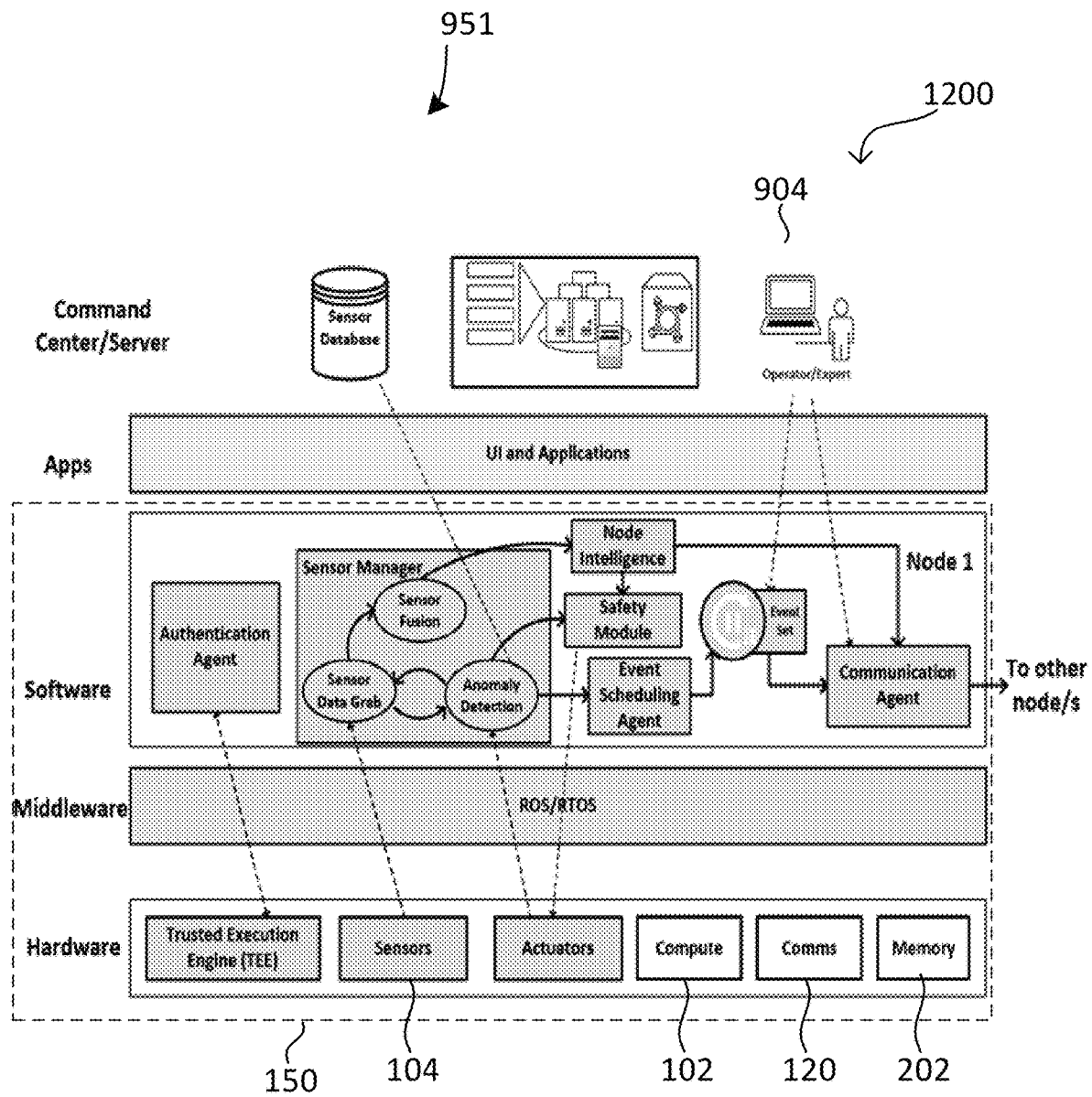
FIG. 12 shows a system in accordance with various aspects of the present disclosure, in a schematic diagram.

FIG. 12 shows a modular system 951 in accordance with various aspects 1200 of the present disclosure, in a schematic diagram, e.g., detailing various components (here referred to as modules) of the system 951, which may be configured in accordance with aspects 100 to 1100. For example, system 951 may be configured for remote attestation, provenance tracking and/or reward (e.g., for the training).

The system 951, e.g., the or each autonomous machine 150, may include a sensor manager module. The sensor manager module may be configured to control (e.g., instruct and/or distribute) the sensing process and/or the self-assessment 503. The sensor manager module may implement one or more of the following: a sensor anomaly detection for flagging any issues and storing it in the database for future use; a sensor data grab and sensor fusion capability; an activation of one or more events through an event scheduling agent.

The system 951, e.g., the or each autonomous machine 150, may include a node intelligence module. Illustratively, the node intelligence module may provide the brain of the system 941. The node intelligence module may be configured to provide the required intelligence for robot sensor discovery and sensor sharing protocols. The node intelligence module may be configured to activate the communication agent module to exchange information across various robots. The output of the node intelligence module may help to drive the actuator to control the intended operation.

The system 951, e.g., the or each autonomous machine 150, may include a safety module implementing the safety model. The term safety module may refer to an safety model from the architecture standpoint. The safety module may be configured to evaluate one or more proposed trajectories and the current environmental condition to determine, e.g., based on behavioral prediction and/or kinematic properties of other autonomous machines, whether the proposed trajectory should be realized by the actuators of the autonomous machine 150 or not. For example, the safety module may implement the safety performance model.

The system 951, e.g., the or each autonomous machine 150, may include one or more actuators. The or each actuators may be configured to perform a physical operation (such as, for example, a movement) of the autonomous machine 150, e.g., by movement and/or mechanical energy transfer.

The system 951, e.g., the or each autonomous machine 150, may include the event scheduling agent module. The event scheduling agent module may be configured to identify key events and/or to schedule them. For instance, the event scheduling module may be configured to schedule and/or trigger (e.g., activate) the robot sensor discovery protocol, when (e.g., in response to) receiving information about a sensor anomaly from the sensor manager (also referred to as anomaly detection).

The system 951, e.g., the or each autonomous machine 150, may include an event set module. The event set module may be configured to implement the set of events identified and scheduled.

The system 951, e.g., the or each autonomous machine 150, may include an authentication agent module. The authentication agent module may be configured to utilizes a security engine to authenticate the autonomous machine with one or more trusted neighboring autonomous machines and with the license infrastructure.

The system 951, e.g., the or each autonomous machine 150, may include a communication agent module. The communication agent module may be configured to provide a secure communication with one or more further autonomous machines or with the operator device.

The system 951 may include one or more user interfaces (UI). For example, user interface may include an application component interface for interaction with a human operator (also referred to as user).

The system 951, e.g., the or each autonomous machine 150, may include the one or more communication device 120 (also referred to as Comms). The one or more communication devices 120 may be configured according to one or more communication technologies, for example, including GPS, Wi-Fi, WiMax, Bluetooth, etc.

The system 951, e.g., the or each autonomous machine 150, may include the one or more processors 102 (e.g., a host CPU) and the one or more memories 202 to provide the computing and storing capability of the autonomous machine.

The system 951, e.g., the or each autonomous machine 150, may include a security engine module (also referred to as TEE—Trusted Execution Environment). The security engine module may include a hardware-based security engine that provides one or more cryptographic operations and a tamper proof secure execution environment.

The system 951, e.g., the or each autonomous machine 150, may include an operation system (OS). The operation system (e.g., a host operating system) may include a software based engine that manages the resources of the autonomous machine 150. An example of an OS for an autonomous machine 150 includes a Robotic Operating System (ROS).

Figure 13:
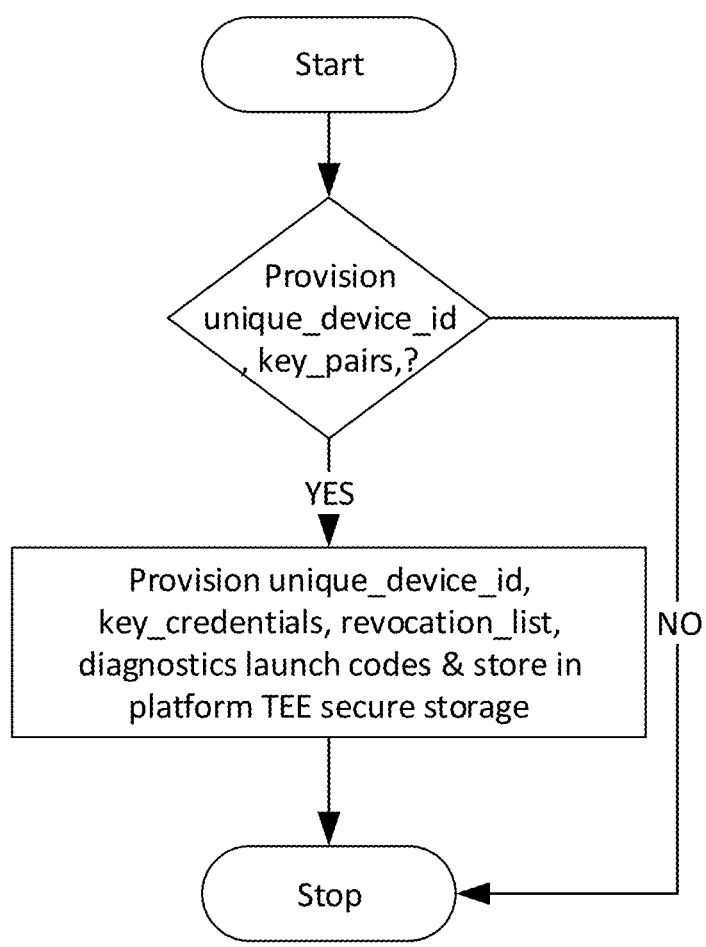
FIG. 13 shows a method in accordance with various aspects of the present disclosure in a schematic flow diagram.

FIG. 13 shows an exemplary implementation of methods described herein in accordance with various aspects 1300 of the present disclosure, in a schematic diagram, which may be configured in accordance with aspects 100 to 1200.

Figure 14:
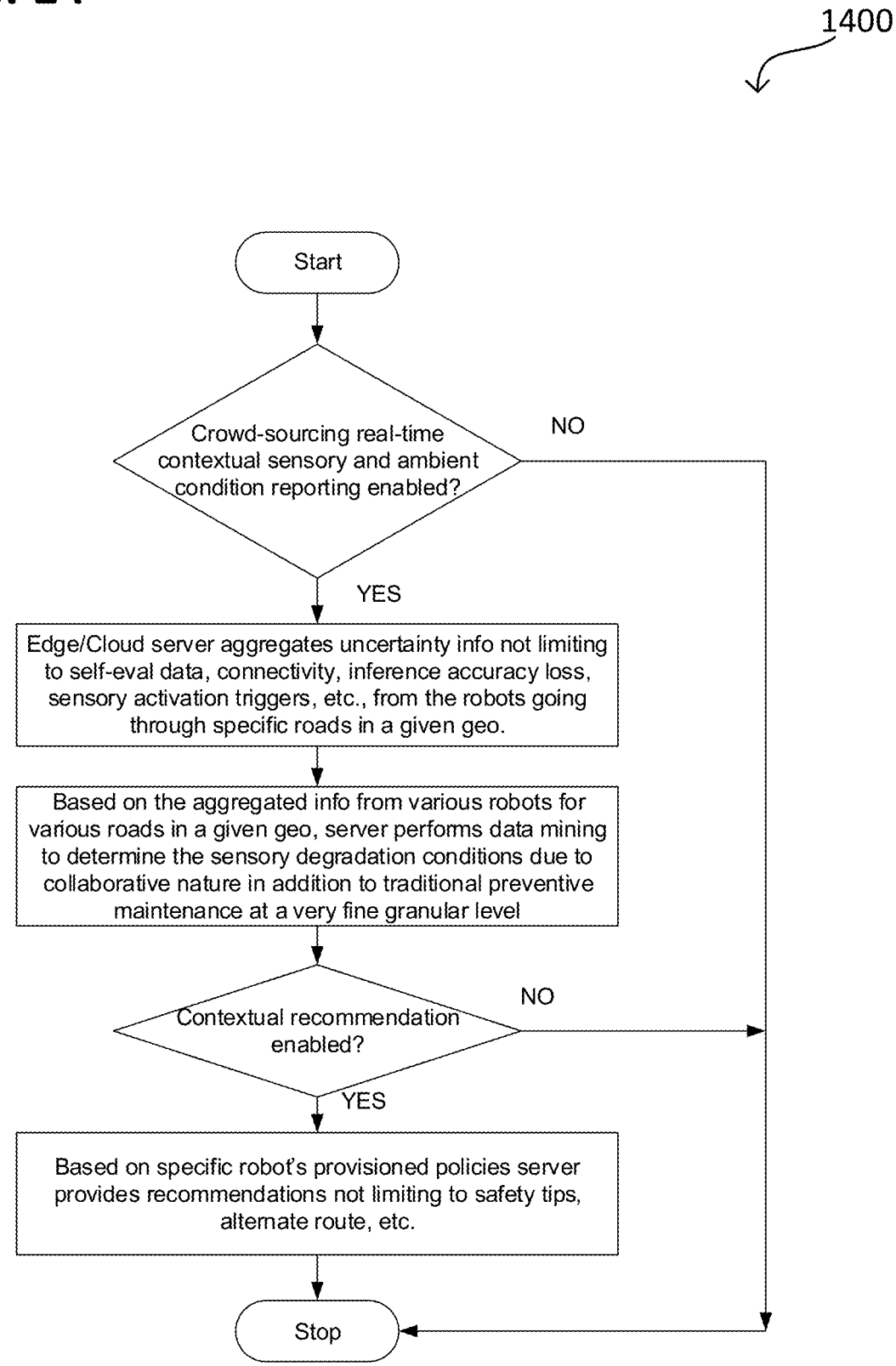
FIG. 14 shows a method in accordance with various aspects of the present disclosure in a schematic diagram.

FIG. 14 shows an exemplary implementation of methods described herein in accordance with various aspects 1400 of the present disclosure, in a schematic diagram, which may be configured in accordance with aspects 100 to 1300.

In the following, various aspects of the present disclosure will be illustrated:

Example 1 is method (e.g., for an automated, e.g., autonomous, machine, e.g., for the monitored machine), the method including: obtaining (e.g., receiving), e.g., by the automated, e.g., autonomous, machine, a first message from a further automated, e.g., autonomous, machine (e.g., the reference machine) in accordance with a (e.g., wireless and/or wired) communication protocol, the first message including a first result of a first sensing process (e.g., a reference sensing process) that the further automated, e.g., autonomous, machine performs; determining, e.g., by the automated, e.g., autonomous, machine, an assessment of the automated, e.g., autonomous, machine (e.g., of at least one sensor thereof) based on the first result and based on a second result of a second sensing process that the automated, e.g., autonomous, machine (e.g., by the at least one sensor of the automated, e.g., autonomous, machine) performs, wherein, for example, the second sensing process is configured to provide the same target information (e.g., a physical quantity) as the first sensing process.

Example 2 is the method according to example 1, wherein the determination of the assessment is based on a comparison of a first determination of the target information with a second determination of the target information, wherein the first determination is based on (e.g., provided with) the first result, wherein the second determination is based on (e.g., provided with) the second result.

Example 3 is the method according to example 1 or 2, wherein the target information represents an operational condition of the first automated, e.g., autonomous, machine, and/or an environmental condition of the first automated, e.g., autonomous, machine.

Example 4 is the method according to example 2 or 3, wherein the assessment represents (e.g., is based on) a deviation of the first determination from the second determination.

Example 5 is the method according to one of examples 1 to 4, wherein the first message is in accordance with a (e.g., wireless and/or wired) communication protocol.

Example 6 is the method according to one of examples 1 to 5, further including: generating, e.g., by the automated, e.g., autonomous, machine, a request to the further automated, e.g., autonomous, machine to provide the first result and/or to perform the first sensing process (e.g., implemented by a sensor sharing protocol), wherein, for example, the request includes a target information provided by the second sensing process, e.g., an object to be sensed by the first sensing process.

Example 7 is the method according to example 6, further including: generating, e.g., by the automated, e.g., autonomous, machine, a second message (e.g., in accordance with the, e.g., wireless and/or wired, communication protocol) including the request.

Example 8 is the method according to example 7, further including: sending, e.g., by the automated, e.g., autonomous, machine, the second message to the further automated, e.g., autonomous, machine (e.g., in accordance with a, e.g., wireless and/or wired, communication protocol); and/or further including; performing, e.g., by the controller and/or the one or more processors thereof, the second sensing process by the one or more sensors of the automated machine.

Example 9 is the method according to one of examples 1 to 8, further including (e.g., to implement a sensor discovery protocol): determining, e.g., by the automated, e.g., autonomous, machine, at least one of multiple automated, e.g., autonomous, machines (e.g., a group of automated, e.g., autonomous, machines) as the further automated, e.g., autonomous, machine based on (e.g. sensor related) information: about the multiple automated, e.g., autonomous, machines (e.g., one or more automated, e.g., autonomous, machines thereof and/or about the automated, e.g., autonomous, machine to be determined as reference machine), e.g., about one or more sensors thereof, and/or about the automated, e.g., autonomous, machine, e.g., about one or more sensors thereof.

Example 10 is the method according to example 9, wherein the determination of the al least one of the multiple automated, e.g., autonomous, machines includes: generating a request to the multiple automated, e.g., autonomous, machines (e.g., to the one or more automated, e.g., autonomous, machines, e.g., to each automated, e.g., autonomous, machine of the multiple automated, e.g., autonomous, machines) to provide the information.

Example 11 is the method according to example 9 or 10, further including: generating, e.g., by the automated, e.g., autonomous, machine, a third message (e.g., in accordance with the, e.g., wireless and/or wired, communication protocol) including the information and/or the request.

Example 12 is the method according to one of examples 9 to 11, wherein the information about the multiple automated, e.g., autonomous, machines represents one or more of the following: one or more sensors (e.g., of one or more automated, e.g., autonomous, machines) of the multiple automated, e.g., autonomous, machines; an assessment of (e.g., one or more automated, e.g., autonomous, machines) of the multiple automated, e.g., autonomous, machines; a location of (e.g., one or more automated, e.g., autonomous, machines) of the multiple automated, e.g., autonomous, machines; a sensing a physical quantity (e.g., one or more automated, e.g., autonomous, machines).

Example 13 is the method according to one of examples 11 to 12, wherein the information about the automated, e.g., autonomous, machine represents one or more of the following: one or more sensors of the automated, e.g., autonomous, machine; an operational condition of the automated, e.g., autonomous, machine; an environmental condition of the automated, e.g., autonomous, machine; a location of the automated, e.g., autonomous, machine; a physical quantity sensed by the second sensing process.

Example 14 is the method according to one of examples 1 to 13, wherein the determination of the assessment is further based on a further assessment of the further automated, e.g., autonomous, machine (e.g., one or more sensors thereof), wherein, for example, the further assessment is provided to the automated, e.g., autonomous, machine (e.g., via the first message).

Example 15 is the method according one of examples 1 to 14, wherein the assessment of the automated, e.g., autonomous, machine represents a reliability of the second sensing process; and/or wherein the further assessment of the further automated, e.g., autonomous, machine represents a reliability of the first sensing process.

Example 16 is the method according to one of examples 1 to 15, wherein the second sensing process includes sensing a result of performing a task by the automated, e.g., autonomous, machine Example 17 is the method according to one of examples 1 to 16, wherein the first sensing process includes sensing a result of performing (e.g. repeating) a or the task by the further automated, e.g., autonomous, machine.

Example 18 is the method according to one of examples 1 to 17, further including: generating, e.g., by the automated, e.g., autonomous, machine, a fourth message (e.g., in accordance with the, e.g., wireless and/or wired, communication protocol), the fourth message indicating the assessment and/or including an instruction based on the assessment, wherein, for example, wherein, for example, the fourth message may be addressed to the further automated, e.g., autonomous, machine and/or to the multiple machines.

Example 19 is the method according to one of examples 1 to 18, further including: updating (e.g., training) and/or generating, e.g., by the automated, e.g., autonomous, machine, an assessment estimation model based on the assessment and/or based on a condition (e.g., environmental condition and/or operational condition) of the automated, e.g., autonomous, machine during the second sensing process, wherein, for example, the condition is sensed by the automated, e.g., autonomous, machine. For example, assessment estimation model 520 does not necessarily be a trained model, e.g., if being a formal model.

Example 20 is the method according to one of examples 1 to 19, further including: estimating, e.g., by the automated, e.g., autonomous, machine, a time of failure of one or more sensors (e.g., of the at least one sensor) of the automated, e.g., autonomous, machine based on the assessment, for example, the one or more sensors performing the second sensing process.

Example 21 is the method according to one of examples 1 to 20, wherein the second sensing process is disposed prior to the first sensing process and/or prior to generating the request.

Example 22 is the method according to one of examples 1 to 21, wherein determining the assessment is performed in response to the determination, e.g., by the automated, e.g., autonomous, machine, of an event; the event including one or more of the following: a change of affiliation of the automated, e.g., autonomous, machine to a group of automated, e.g., autonomous, machines; a change of assignment of the automated, e.g., autonomous, machine to a task; an imminent maintenance of the automated, e.g., autonomous, machine; an completion of a maintenance of the automated, e.g., autonomous, machine; an environmental change of the automated, e.g., autonomous, machine; an instruction by an human operator to determine the assessment; an anomaly relating to the automated, e.g., autonomous, machine; a (e.g., by the automated, e.g., autonomous, machine) stored criterion is fulfilled.

Example 23 is the method according to one of examples 1 to 22, further including: requesting, e.g., by the automated, e.g., autonomous, machine, a maintenance of the automated, e.g., autonomous, machine, when (e.g., in response to) the assessment fulfills a criterion, for example, the criterion being fulfilled when the assessment represents a lack of reliability of the second sensing process.

Example 24 is a method (e.g., for an automated, e.g., autonomous, machine and/or according to one of examples 1 to 22), including: determining, e.g., by the automated, e.g., autonomous, machine, if a (e.g., being the second) sensing process, that (e.g., by using one or more sensors of) the automated, e.g., autonomous, machine performs, fulfills a reliability criterion (e.g., being stored by the automated, e.g., autonomous, machine); generating, when (e.g., in response to) the reliability criterion is not fulfilled, a fifth message (e.g., being the second message) to the or another further automated, e.g., autonomous, machine (e.g., in accordance with a, e.g., wireless and/or wired, communication protocol), the fifth message including a request to provide a result of a further (e.g., being the first) sensing process using one or more sensors of the further automated, e.g., autonomous, machine, wherein, for example, the second sensing process being prior to the first sensing process, wherein, for example, the sensing process is configured to provide the same target information (e.g., a physical quantity) as the further sensing process.

Example 25 is the method according to example 24, wherein the reliability criterion is not fulfilled when one or more of the following occurs: a result (e.g., its statistical error) of the sensing process exceeds a (e.g., stored) tolerance range or value; and/or an environmental condition of the automated, e.g., autonomous, machine changes.

Example 26 is a controller (e.g. for the automated, e.g., autonomous, machine), including one or more processors configured to perform the method according to one of examples 1 to 25.

Example 27 is one or more non-transitory computer-readable media storing instructions thereon that, when executed by one or more processors, direct the one or more processors to perform the method according to one of examples 1 to 25.

Example 28 is an automated, e.g., autonomous, machine including the controller according to example 26 and/or the one or more non-transitory computer-readable media according to example 27.

Example 29 is the automated, e.g., autonomous, machine according to example 28, further including: one or more sensors (e.g., including the at least one sensor), of which at least one sensor is configured to perform the second sensing process and/or the sensing process.

Example 30 is a system, including the automated, e.g., autonomous, machine according to example 28 or 29 and the further automated, e.g., autonomous, machine, wherein, for example, the further automated, e.g., autonomous, machine includes at least one sensor configured to perform the first sensing process and/or the further sensing process, wherein, for example, the further automated, e.g., autonomous, machine includes at least one sensor being complementary to the at least one sensor of the automated, e.g., autonomous, machine.

Example 31 is the system according to example 30, wherein the automated, e.g., autonomous, machine and the further automated, e.g., autonomous, machine (e.g., the one or more processors thereof) are configured to implement a collaborative task management and/or are members of a group of automated, e.g., autonomous, machines.

Example 32 is a method (e.g., for an automated, e.g., autonomous, machine, e.g., being the further automated, e.g., autonomous, machine according to one of examples 1 to 31 and/or being the reference machine) including: obtaining, e.g., by the automated, e.g., autonomous, machine, a first message from a further automated, e.g., autonomous, machine (e.g., being the automated, e.g., autonomous, machine according to one of examples 1 to 31 and/or being the monitored machine), e.g., in accordance with a, e.g., wireless and/or wired, communication protocol, the first message including a request to provide a result of a sensing process (e.g., the message further indicating a target information of the sensing process) and/or indicating a target information to be provided by the sensing process; generating, e.g. by the automated, e.g., autonomous, machine, a second message to the further automated, e.g., autonomous, machine in accordance with the, e.g., wireless and/or wired, communication protocol, the second message including the result of the sensing process that the automated, e.g., autonomous, machine performs, wherein, for example, the automated, e.g., autonomous, machine and the further automated, e.g., autonomous, machine (e.g., the one or more processors thereof) are configured to implement a collaborative task management and/or are members of a group of automated, e.g., autonomous, machines.

Example 33 is a controller, including one or more processors configured to perform the method according to example 32.

Example 34 is one or more non-transitory computer-readable media storing instructions thereon that, when executed by one or more processors, direct the one or more processors to, perform the method according to example 32.

Example 35 is an automated, e.g., autonomous, machine including the controller according to example 33 and/or the one or more non-transitory computer-readable media according to example 34.

Example 36 is the automated, e.g., autonomous, machine according to example 35, further including: one or more sensors, of which at least one sensor is configured to perform the sensing process.

Example 37 is a system, including the automated, e.g., autonomous, machine according to example 35 or 36 and the further automated, e.g., autonomous, machine, wherein, for example, the further automated, e.g., autonomous, machine includes at least one sensor being complementary to the at least one sensor of the automated, e.g., autonomous, machine.

Example 38 is the system according to example 37, wherein the automated, e.g., autonomous, machine and the further automated, e.g., autonomous, machine are configured to implement a collaborative task management.

Example 39 is a method (e.g., that a controller and/or one or more processors of the controller implement, for example, the controller being part of a server), including: implementing (e.g., by the controller and/or the one or more processors thereof) a, e.g., wireless and/or wired, data exchange protocol of a group of automated, e.g., autonomous, machines to exchange data (e.g., according to a collaborative task management); wherein the data includes a first result of a first sensing process that a first automated, e.g., autonomous, machine of the group of automated, e.g., autonomous, machines performs and wherein the data includes a second result of a second sensing process that a second automated, e.g., autonomous, machine (e.g., the reference machine) of the group of automated, e.g., autonomous, machines performs; determining (e.g., by the controller and/or the one or more processors thereof) information (e.g., being an evaluation) based on the first result and based on the second result; optionally storing (e.g., by the controller and/or the one or more processors thereof) the information.

Example 40 is the method according to example 39, wherein the information includes (e.g., being formed from) or is assigned to one or more of the following: an assessment of the first automated, e.g., autonomous, machine (e.g., the monitored machine); an assessment of the second automated, e.g., autonomous, machine (e.g., the monitored machine); contextual information about the first automated, e.g., autonomous, machine (e.g., the monitored machine) and/or the second automated, e.g., autonomous, machine (e.g., the monitored machine); machine related information (e.g., provenance, fabricator, model, year of fabrication, known issues, recalls) about the first automated, e.g., autonomous, machine (e.g., the monitored machine) and/or the second automated, e.g., autonomous, machine (e.g., the monitored machine); operator related information about the first automated, e.g., autonomous, machine (e.g., the monitored machine) and/or the second automated, e.g., autonomous, machine (e.g., the monitored machine); crowed-sourced information from a peer automated machine; information from statistically deployed sources (e.g., sensors, e.g., cameras, human measured data; data from infrastructure); a maintenance record of the first automated, e.g., autonomous, machine (e.g., the monitored machine) and/or the second automated, e.g., autonomous, machine (e.g., the monitored machine); information about an error margin of the first result and/or the second result; feedback about or from the first automated, e.g., autonomous, machine (e.g., the monitored machine) and/or the second automated, e.g., autonomous, machine (e.g., the monitored machine); infrastructure related information regarding the exchange of data according to the data exchange protocol; the first result and/or the second result.

Example 41 is the method according to example 39 or 40, wherein the determining the information is further based on one or more of the following: a revocation management; a Trusted Execution Environment; a co-relation of crowd-sourced data with data from the statistically deployed sources and the feedback Example 42 is the method according to one of examples 39 to 41, further including: providing (e.g., by the controller and/or the one or more processors thereof), based on the information, one or more of the following; a revocation management; data mining to determine sensory degradation, e.g., based on the collaboration of the first automated, e.g., autonomous, machine (e.g., the monitored machine) and/or the second automated, e.g., autonomous, machine (e.g., the monitored machine) with one another and/or with the infrastructure; update (e.g., tuning) a data mining logic for (e.g., performing) the data mining based on the feedback; one or more notifications and/or one or more alerts to one or more users, e.g., based on provisioned policies; one or more contextual recommendations to compensate and/or mitigate the sensory degradation, e.g., based on the error margin and/or the sensory degradation.

Example 43 is a controller, including one or more processors configured to perform the method according to one of examples 39 to 42.

Example 44 is one or more non-transitory computer-readable media storing instructions thereon that, when executed by one or more processors, direct the one or more processors to, perform the method according to one of examples 39 to 42.

Example 45 is a network node (e.g., a server) including the controller according to example 43 and/or the one or more non-transitory computer-readable media according to example 44.

Example 46 is a system, including the network node according to example 45, and further including the first automated, e.g., autonomous, machine and/or the second automated, e.g., autonomous, machine.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A controller for an automated machine, the controller comprising:
    a processor configured to
        obtain a message from a second automated machine in accordance with a communication protocol, the message comprising a second result of a second sensing process performed by the second automated machine of an operational condition of the automated machine or of an environmental condition of the automated machine;
        determine an assessment of the automated machine based on the second result and based on a first result of a first sensing process performed by the automated machine of the operational condition or of the environmental condition, wherein the assessment represents a reliability of the first sensing process; and
        estimate a time of failure of a sensor of the automated machine based on the assessment, wherein the sensor is configured to perform the first sensing process.

2. The controller according to claim 1, wherein the operational condition or the environmental condition comprises a target information, wherein the determination of the assessment is based on a comparison of a first determination of the target information with a second determination of the target information, wherein the first determination is based on the first result, and wherein the second determination is based on the second result.

3. The controller according to claim 1, the processor further configured to:
    generate a request to the second automated machine to provide the second result.

4. The controller according to claim 1, the processor further configured to:
    determine one automated machine of multiple automated machines as the second automated machine based on sensor related information of the multiple automated machines or about the automated machine.

5. The controller according to claim 4, wherein the determination of the one automated machine further comprises to generate a request to the multiple automated machines to provide the sensor related information.

6. The controller according to claim 1, wherein the first sensing process comprises sensing a result of performing a task by the automated machine.

7. The controller according to claim 6, wherein the second sensing process comprises sensing a result of performing the task by the second automated machine.

8. The controller according to claim 1, the processor further configured to:
    generate a message in accordance with the communication protocol, the message indicating the assessment or comprising an instruction based on the assessment.

9. The controller according to claim 1, the processor further configured to:
    update or generate an assessment estimation model based on the assessment and based on a condition of the automated machine during the first sensing process.

10. The controller according to claim 1, the processor further configured to determine the assessment in response to the determination of an event; the event comprising one or more of the following:
    a change of affiliation of the automated machine to a group of automated machines;
    a change of assignment of the automated machine to a task;
    an imminent maintenance of the automated machine;
    a completion of a maintenance of the automated machine;
    an environmental change of the automated machine;
    an instruction from a human operator to determine the assessment;
    an anomaly relating to the automated machine;
    a stored criterion is fulfilled.

11. A controller for an automated machine, the controller comprising:
    a processor configured to:
        determine, if a sensing process using a sensor of the automated machine fulfills a reliability criterion, wherein the sensing process is of an operational condition of the automated machine or of an environmental condition of the automated machine;
        generate, when the reliability criterion is not fulfilled, a message to a second automated machine in accordance with a communication protocol, the message comprising a request to provide a result of a second sensing process using a sensor of the second automated machine, wherein the result represents an assessment by the second automated machine of a reliability of the first sensing process; and
        estimate a time of failure of the sensor of the automated machine based on whether the sensing process fulfills the reliability criterion.

12. A controller for an automated machine comprising:
    a sensor configured to perform a first sensing process, and
    a processor configured to
        obtain a first message from a second automated machine in accordance with a communication protocol, the first message comprising a request to provide an assessment by the second automated machine of a reliability of a result of the first sensing process, wherein the first sensing process is of an operational condition of the automated machine or of an environmental condition of the automated machine;

generate a second message to the second automated machine in accordance with the communication protocol, the second message comprising the result of the first sensing process performed by the automated machine; and obtain a third message from the second automated machine in accordance with the communication protocol, the third message comprising an estimated time of failure of the sensor of the automated machine based on the reliability.

13. A controller, comprising:
a processor configured to
implement a data exchange protocol of a group of automated machines to exchange data; wherein the data comprises a first result of a first sensing process that a first automated machine of the group of automated machines performs using a sensor and wherein the data comprises a second result of a second sensing process that a second automated machine of the group of automated machines performs, wherein the second result of the second sensing process represents a reliability of the first sensing process;

determine an evaluation based on the first result and based on the second result, and estimate a time of failure of the sensor of the automated machine based on the reliability of the first sensing process.

14. The controller according to claim 13, wherein the evaluation includes or is assigned to one or more of the following:

an assessment of the first automated machine;
an assessment of the second automated machine;
contextual information of the first automated machine or the second automated machine;
machine related information of the first automated machine or the second automated machine;
operator related information of the first automated machine or the second automated machine;
crowed-sourced information from a peer automated machine;
information from statistically deployed sources;
a maintenance record of the first automated machine or the second automated machine;
information about an error margin of the first result or the second result;
feedback about or from the first automated machine or the second automated machine;
infrastructure related information regarding the exchange of data according to the data exchange protocol;
the first result or the second result.

15. The controller according to claim 14, wherein the processor is configured to:
determine the evaluation further based on one or more of the following:
a Trusted Execution Environment;
a co-relation of crowd-sourced data with data from the statistically deployed sources and the feedback; or
provide, based on the evaluation, one or more of the following:
a revocation management;
a data mining to determine sensory degradation;
updating a data mining logic for the data mining based on the feedback;
a notification or alert to a user;
a contextual recommendation to compensate and/or mitigate the sensory degradation.

* * * * *